(12) United States Patent
Cawse et al.

(10) Patent No.: US 10,942,871 B2
(45) Date of Patent: Mar. 9, 2021

(54) INTELLIGENT BLUETOOTH BEACON I/O EXPANSION SYSTEM

(71) Applicant: Geotab Inc., Oakville (CA)

(72) Inventors: Neil Charles Cawse, Oakville (CA); Darren Marc Lohmann Beams, Oakville (CA); Stephen Michael Fox, Mississauga (CA); Cong Zhu, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 14/756,054

(22) Filed: Jul. 27, 2015

(65) Prior Publication Data

US 2017/0031840 A1 Feb. 2, 2017
US 2019/0095358 A9 Mar. 28, 2019

Related U.S. Application Data

(60) Continuation-in-part of application No. 14/121,847, filed on Oct. 24, 2014, now Pat. No. 9,128,867, which is a division of application No. 13/506,478, filed on Apr. 23, 2012, now Pat. No. 8,918,547.

(51) Int. Cl.
| | |
|---|---|
| *G06F 13/10* | (2006.01) |
| *H04W 4/029* | (2018.01) |
| *H04W 4/38* | (2018.01) |
| *H04W 4/80* | (2018.01) |
| *H04W 4/02* | (2018.01) |
| *H04W 4/44* | (2018.01) |
| *G08C 17/02* | (2006.01) |

(52) U.S. Cl.
CPC ........... *G06F 13/102* (2013.01); *G08C 17/02* (2013.01); *H04W 4/027* (2013.01); *H04W 4/029* (2018.02); *H04W 4/38* (2018.02); *H04W 4/44* (2018.02); *H04W 4/80* (2018.02)

(58) Field of Classification Search
CPC ....... G06F 13/102; H04W 4/008; G08C 17/02
See application file for complete search history.

(56) References Cited

U.S. PATENT DOCUMENTS

| | | | |
|---|---|---|---|
| 5,016,003 A | 5/1991 | Rice et al. | |
| 6,636,790 B1 | 10/2003 | Lightner et al. | |
| 6,732,031 B1 | 5/2004 | Lightner et al. | |
| 6,957,133 B1 | 10/2005 | Hunt et al. | |
| 7,228,211 B1 * | 6/2007 | Lowrey ................. | G07C 5/008 701/31.5 |

(Continued)

OTHER PUBLICATIONS

U.S. Appl. No. 16/404,227, filed May 6, 2019, Cawse et al.
U.S. Appl. No. 16/915,773, filed Jun. 29, 2020, Cawse et al.

*Primary Examiner* — Idriss N Alrobaye
*Assistant Examiner* — Ronald T Modo
(74) *Attorney, Agent, or Firm* — Wolf, Greenfield & Sacks, P.C.

(57) ABSTRACT

Apparatus, methods and system relating to a vehicular telemetry environment for an intelligent Bluetooth beacon I/O expansion of the vehicular telemetry hardware system. The intelligent Bluetooth beacon I/O expansion provides a capability to receive beacon data, log beacon data, communicate beacon data and operate on beacon data to determine and further communicate a range of operational conditions, such as damage, hazardous and missing objects in the form of text messages, audio messages or compliance and management reports.

38 Claims, 20 Drawing Sheets

(56) References Cited

U.S. PATENT DOCUMENTS

| | | | |
|---|---|---|---|
| 7,778,752 B1* | 8/2010 | Hunt | B60R 16/0207 701/31.4 |
| 2001/0016789 A1 | 8/2001 | Staiger | |
| 2003/0130774 A1 | 6/2003 | Tripathi | |
| 2004/0111191 A1 | 6/2004 | Muller | |
| 2006/0180365 A1 | 8/2006 | Innami et al. | |
| 2009/0024272 A1 | 1/2009 | Rogers et al. | |
| 2009/0084623 A1 | 4/2009 | Dagenais | |
| 2009/0088207 A1* | 4/2009 | Sweeney | H04M 19/04 455/557 |
| 2010/0094769 A1 | 4/2010 | Davidson et al. | |
| 2010/0153207 A1 | 6/2010 | Roberts et al. | |
| 2010/0205000 A1 | 8/2010 | Cho | |
| 2011/0071880 A1* | 3/2011 | Spector | H04W 4/22 340/573.1 |
| 2011/0078089 A1 | 3/2011 | Hamm et al. | |
| 2011/0166742 A1 | 7/2011 | Hunt et al. | |
| 2012/0004804 A1 | 1/2012 | Beams et al. | |
| 2012/0079306 A1 | 3/2012 | Jayakumar et al. | |
| 2012/0253892 A1* | 10/2012 | Davidson | G06Q 10/08 705/7.42 |
| 2013/0084882 A1 | 4/2013 | Khorashadi et al. | |
| 2013/0084890 A1 | 4/2013 | Smely et al. | |
| 2013/0303143 A1* | 11/2013 | Schrader | H04W 12/08 455/418 |
| 2013/0346336 A1 | 12/2013 | Murphy et al. | |
| 2014/0222298 A1 | 8/2014 | Gurin | |
| 2014/0266698 A1 | 9/2014 | Hall et al. | |
| 2014/0279707 A1* | 9/2014 | Joshua | G06Q 30/0283 705/400 |
| 2015/0036881 A1 | 2/2015 | Sharma et al. | |
| 2015/0178822 A1* | 6/2015 | Babiarz | G06Q 30/00 705/26.7 |
| 2019/0258591 A1 | 8/2019 | Cawse et al. | |

\* cited by examiner

INTELLIGENT BLUETOOTH BEACON I/O EXPANSION SYSTEM

This application claims the benefit under 35 U.S.C. § 120 as a continuation-in-part of U.S. patent application Ser. No. 14/121,847 filed Oct. 24, 2014 that claims the benefit under 35 U.S.C. § 121 as a divisional of U.S. patent application Ser. No. 13/506,478 filed Apr. 23, 2012 and entitled "Configurable Intelligent I/O Expansion System".

TECHNICAL FIELD OF THE INVENTION

The present invention generally relates to an apparatus, method and system for application in vehicular telemetry environment. More specifically, the present invention relates to an intelligent Bluetooth® beacon I/O (input/output) expansion system and services.

BACKGROUND OF THE INVENTION

Vehicular Telemetry systems with I/O expansion and communication capabilities are known in the prior art.

United States published patent application 2004/0111191 to Jeroen et al is directed to a marine telematics system comprising a satcom unit on a boat, a user interface for the satcom unit, a web-based user interface for the telematics system, and a land-based center of operations. The land-based center of operations receives signals from the satcom unit on the boat about the location of the boat and sensor responses to detectable events. The marine telematics system is customizable through a web-based interface, allowing boat owners to provide information and instructions to the land-based center of operations for handling particular situations that may arise while the boat is in use or at dock. The web-based interface further allows boat owners to plan voyages by setting series of waypoints, and the land-based center of operations may assist the boat owners by providing feedback during their voyages based on the waypoint information previously provided by the boat owners. The marine telematics system of the invention allows users to remotely monitor the location of boats and events detected on boats, and to remotely activate equipment on boats.

United States published patent application 2001/0016789 to Staiger is directed to an electronic control system for controlling the function of a processing system, especially for the use in an automotive vehicle, wherein the control system comprises a plurality of logical control elements, each of which is especially adapted to perform special tasks, whereby each of the control elements is able to communicate with every other control element.

U.S. Pat. No. 7,228,211 to HTI is directed to an invention that provide an in-vehicle telematics system featuring: 1) a controller; 2) a diagnostics system configured to receive diagnostic information from a host vehicle; 3) a position-locating system configured to determine the host vehicle's location information; 4) a communication interface configured to send additional information to a peripheral system other than the diagnostic position-locating systems; and 5) a wireless transmitter configured to transmit information through a wireless network to an Internet-accessible website.

U.S. Pat. Nos. 6,732,031 and 6,636,790 to Reynolds and Reynolds Holding Inc. is directed to a method and apparatus for remotely characterizing a vehicle's performance. The method features the steps of: 1) generating data representative of the vehicle's performance with at least one microcontroller disposed within the vehicle; 2) transferring the data through an ODB, OBD-II or equivalent electrical connector to a data collector/router that includes a microprocessor and an electrically connected wireless transmitter; 3) transmitting a data packet representing the data with the wireless transmitter over an airlink to a wireless communications system and then to a host computer; and 4) analyzing the data packet with the host computer to characterize the vehicle's performance.

U.S. Pat. No. 6,957,133 to Reynolds and Reynolds Holdings Inc. is directed to a wireless appliance for monitoring a vehicle. The appliance includes: 1) a microprocessor; 2) a vehicle-communication circuit; 3) a GPS module; and 4) a wireless transmitter. The wireless transmitter receives and transmits location based data generated by the GPS module and diagnostic data collected by the vehicle-communication circuit. The vehicle-communication circuit is integrated into a single ASIC that includes modules for managing different vehicle-communication protocols, such as, for example J1850 PWM, J1850 VPWM, ISO 9141-2, CAN, Keyword 2000, and J170S.

U.S. Pat. No. 7,778,752 to HTI is directed to a system for connecting a telematics device to a host vehicle. The system may comprise a short-range wireless transmitter and a short-range wireless receiver. The short-range wireless transmitter may be connected to an in-vehicle diagnostic system. The short-range wireless receiver may be connected to the telematics device installed in the host vehicle. The short-range wireless transmitter may be configured to wirelessly transmit diagnostic data to the short-range wireless receiver.

United States published patent application 2011/0166742 is directed to a system for connecting a telematics device to a host vehicle. The system may comprise a short-range wireless transmitter and a short-range wireless receiver. The short-range wireless transmitter may be connected to an in-vehicle diagnostic system. The short-range wireless receiver may be connected to the telematics device installed in the host vehicle. The short-range wireless transmitter may be configured to wirelessly transmit diagnostic data to the short-range wireless receiver.

SUMMARY OF THE INVENTION

The present invention is directed to aspects in a vehicular telemetry environment and provides a new capability for a telemetry wireless beacon apparatus, method and system.

According to a first broad aspect of the invention, there is a telemetry wireless beacon apparatus. The telemetry wireless beacon apparatus comprises a wireless beacon communication device, and a vehicle device. The vehicle device further comprises a processor, firmware, communications processor, telematic sensors and an interface to communicate with a vehicle network communications bus. The processor and firmware capable to monitor and receive data in real time from the interface, the telematics sensors and said wireless beacon communication device thereby capable to log the data for subsequent communication to a remote device.

According to a second broad aspect of the invention, there is a telemetry wireless beacon data monitoring and logging method. The telemetry wireless beacon data monitoring and logging method comprises monitoring and receiving data from at least one of an interface to vehicle engine data or telematics sensors. Receiving beacon data provided by a wireless beacon communication device, and logging data and beacon data as telemetry data for subsequent communication to a remote device.

According to a third broad aspect of the invention, there is a telemetry wireless beacon data preprocessing method. The telemetry wireless beacon data preprocessing method comprises accessing a log of telemetry data. The telemetry data includes data and beacon data. Translating the data into at least one of engine codes, G forces, or map locations. For each unique identifier in the beacon data, translating the beacon data into at least one of a beacon temperature, beacon pressure, beacon light, beacon acceleration, beacon battery level or beacon user defined sensor reading. Storing a preprocessing telemetry log of the telemetry data for further fleet management condition processing.

According to a fourth broad aspect of the invention, there is a telemetry wireless beacon system. The telemetry wireless beacon system comprises at least one wireless beacon communication device, at least one beacon device, at least one remote device, and at least one vehicle device. The at least one vehicle device further comprises a processor, firmware, communications processor, telematics sensors and an interface to communicate with a vehicle network communications bus. The at least one beacon device capable to communicate beacon data with said wireless beacon communication device. The at least one vehicle device capable to communicate with the at least one remote device, wherein the processor and firmware capable to monitor and receive data from the interface, the telematics sensors and the wireless beacon communication device thereby capable to log the data for subsequent communication to the at least one remote device.

According to a fifth broad aspect of the invention, there is a telemetry wireless beacon data fleet management condition determination method. The telemetry wireless beacon data fleet management condition determination method comprises providing at least access to first data that identifies and associates beacon unique identifiers with objects, providing at least access to second data of threshold values and limits associated with beacon data, providing access to a preprocessing telemetry log of telemetry data and determining each object location located with a vehicle. The determine each object location with a vehicle further comprising identifying each beacon unique identifier disposed with an initial vehicle location. Identifying each beacon unique identifier disposed with a second vehicle location. The second vehicle location determined by one of a speed, distance, location or geofence, wherein the identifying each beacon unique identifier disposed with a second vehicle location determines an accurate number of objects disposed with a vehicle.

In embodiments of the invention, the telematics sensors include at least one of an accelerometer device or GPS device.

In embodiments of the invention, the wireless beacon communication device is a Bluetooth wireless beacon communication device capable of communicating with a beacon device.

In embodiments of the invention, the telemetry wireless beacon apparatus includes at least one I/O expander.

In embodiments of the invention, the wireless beacon communication device is integral with said vehicle device. In other embodiments of the invention, the wireless beacon communication device is integral with said I/O expander. In other embodiments of the invention, the wireless beacon communication device is a device connectable to said I/O expander.

In embodiments of the invention, the at least one beacon device disposed with at least one object. In other embodiments of the invention, the at least one object is selected from the group of package, equipment, vehicle or people.

In embodiments of the invention, the data is selected from the group of GPS data, engine data, vehicle data, speed data, position data, direction data or vehicle acceleration data. In other embodiments of the invention, the data is further selected from the group of beacon unique identifier data, beacon temperature data, beacon light data, beacon pressure data, beacon acceleration data, beacon battery data or beacon user defined data.

In embodiments of the invention, the at least one beacon device further comprises a beacon processor, beacon firmware, beacon radio module and at least one of a beacon accelerometer and beacon sensors. In embodiments of the invention, beacon sensors are selected from the group of a temperature sensor, an illumination sensor, a pressure sensor, a battery sensor or a user defined sensor.

In embodiments of the invention, the telematics sensors include an accelerometer and the data includes accelerometer data. In other embodiments of the invention, the telematics sensors include a GPS device and the data includes location data. Data may also include engine data and vehicle speed data.

In embodiments of the invention, receiving beacon data provided by a wireless beacon communication device includes beacon data from a beacon device.

In embodiments of the invention, receiving beacon data provided by a wireless beacon communication device is received directly by a telemetry wireless beacon device. In other embodiments of the invention, receiving beacon data provided by a wireless beacon communication device is received indirectly through an I/O expander.

In embodiments of the invention for the preprocessing method, further including preprocessing the data into at least one of a minimum value, maximum value or range of values. In other embodiments of the invention, preprocessing each of the beacon data associated with a unique identifier into at least one of a minimum value, maximum value or range of values.

In embodiments of the invention for the preprocessing method, further including associating at least one of engine codes, G forces, vehicle speed, and map location with each unique identifier and at least one of a beacon temperature, beacon pressure, beacon light, beacon acceleration, beacon battery level, or beacon user defined sensor reading.

In embodiments of the invention, the wireless beacon communication device is a Bluetooth wireless beacon communication device.

In embodiments of the telemetry wireless beacon data fleet management condition determination method, the method further comprises accessing the preprocessing telemetry log of telemetry data, identifying the beacon unique identifier and beacon data, comparing the beacon data with the second data, when the beacon data is beyond a damage threshold or damage limit value of the second data, communicate an object damage condition. In embodiments of the invention, the damage threshold or damage limit value is selected from the group of a G force, temperature, a pressure, or a user defined sensor value.

In embodiments of the telemetry wireless beacon data fleet management condition determination method, the method further comprises accessing the preprocessing telemetry log of telemetry data, identifying the beacon unique identifier and beacon data, comparing the beacon data with the second data, when the beacon data is beyond a hazardous threshold or hazardous limit value of the second data, communicate a hazardous object condition. In embodiments of the invention, the hazardous threshold or damage limit value is selected from the group of a G force, temperature, a pressure, or a user defined sensor value.

In embodiments of the telemetry wireless beacon data fleet management condition determination method, the method further comprises accessing the preprocessing telemetry log of telemetry data, identifying the beacon unique identifier and beacon data, for a beacon unique identifier, comparing the beacon unique identifier with the second vehicle location to the presence or absence of the beacon unique identifier at a third vehicle location, and communicate a missing object condition if the beacon unique identifier is absence at the third vehicle location.

In embodiment of the telemetry wireless beacon data fleet management condition determination method, the determination and communication of a condition is one of a message to an I/O expander where the message is converted from text to speech as an audio alarm, a message on a computer, a compliance report or a flett management report.

These and other aspects and features of non-limiting embodiments are apparent to those skilled in the art upon review of the following detailed description of the non-limiting embodiments and the accompanying drawings.

BRIEF DESCRIPTION OF THE DRAWINGS

Exemplary non-limiting embodiments of the present invention are described with reference to the accompanying drawings in which.

The drawings are not necessarily to scale and may be diagrammatic representations of the exemplary non-limiting embodiments of the present invention.

DETAILED DESCRIPTION

Telematic Communication System

Figure 1:
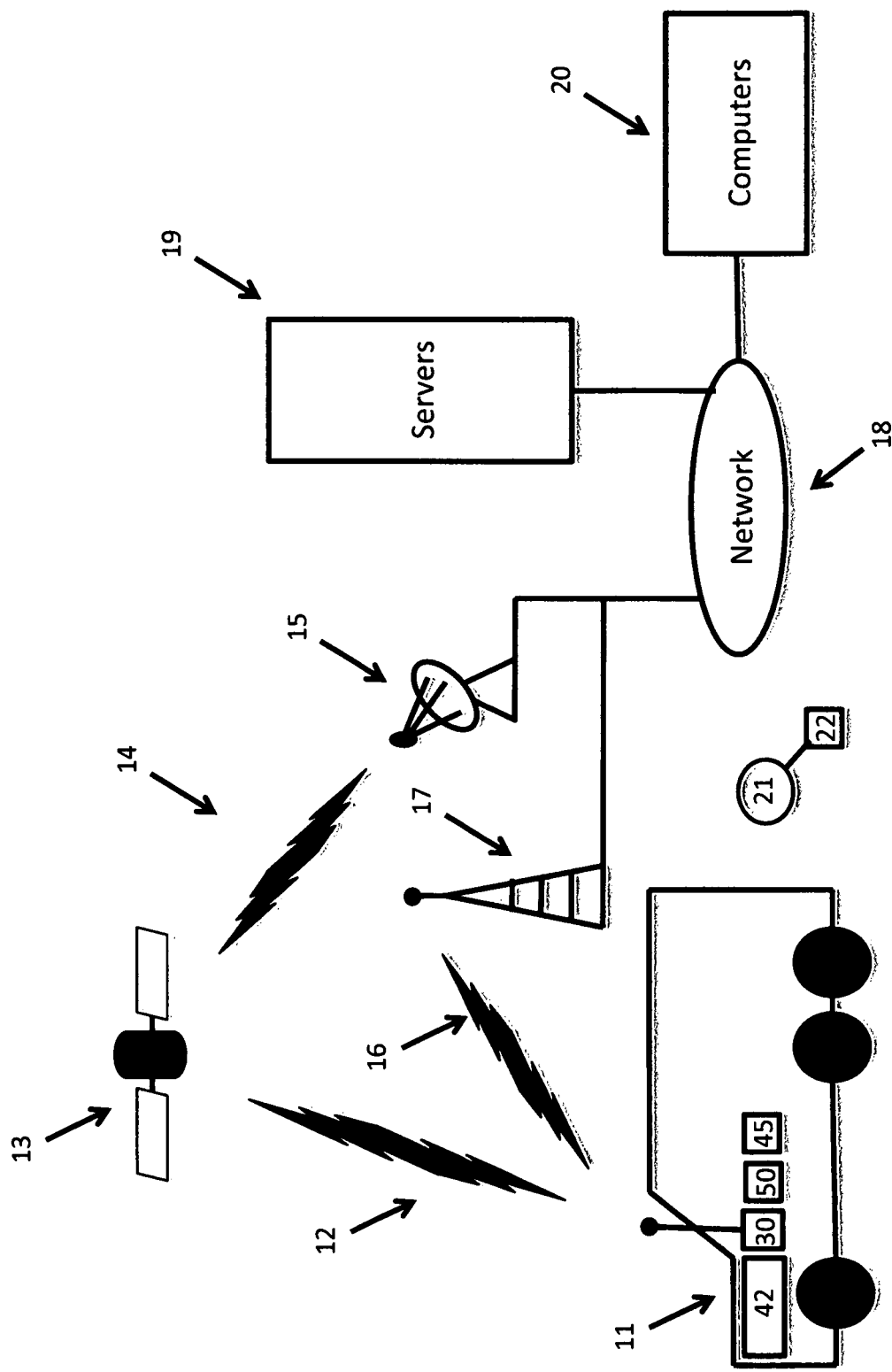
FIG. 1 is a high level diagrammatic view of a vehicular telemetry communication environment.

Referring to FIG. 1 of the drawings, there is illustrated a high level overview of a telematic communication environment. There is at least one vehicle generally indicated at 11. The vehicle 11 includes a vehicular telemetry hardware system 30 and a resident vehicular portion 42. Optionally connected to the telemetry hardware system 30 is at least one intelligent I/O expander 50. In addition, there is at least one Bluetooth module 45 for communication with at least one of the vehicular telemetry hardware system 30 or the intelligent I/O expander 50. The Bluetooth module 45 may also be in periodic communication with at least one Bluetooth beacon 21. The at least one Bluetooth beacon may be attached or affixed or associated with at least one object 22 associated with the vehicle 11 to provide a range of indications concerning the objects. These objects include, but are not limited to packages, equipment, drivers and support personnel.

The telematic communication environment provides communication and exchange of data, information, commands, and messages between the servers 19, computers 20 (desktop computers, hand held device computers, smart phone computers, tablet computers, notebook computers, wearable devices and other computing devices), and vehicles 11. In one example, the communication 12 is to/from a satellite 13. The satellite 13 in turn communicates with a ground-based system 15 connected to a computer network 18. In another example, the communication 16 is to/from a cellular network 17 connected to the computer network 18. In an embodiment of the invention, communication 16 to/from the cellular network 17 is facilitated by the vehicular telemetry hardware system 30. In another embodiment of the invention, an intelligent I/O expander 50 facilitates communication 12 to/from the satellite 13. Further examples of communication devices include WiFi devices and Bluetooth devices.

Computer 20 and server 19 with corresponding application software communicate over the computer network 18. In an embodiment of the invention, the MyGeotab™ telematic application software runs on a server 19. Clients operating a computer 20 communicate with the MyGeotab™ application software running on the server 19. Data, information, messages and commands may be sent and received over the telemetic communication environment between the vehicular telemetry hardware system 30, intelligent I/O expander 50, and the server 19. While the diagram illustrates s single server 19 and computer 20, the invention may include a plurality of servers 19 and computers 20 accessing the network 18.

In an embodiment of the invention, data and information may be sent from the vehicular telemetry hardware system 30 to the cellular network 17, to the computer network 18, and to the servers 19. Computers 20 may access the data and information on the servers 19. Alternatively, data, information, and commands may be sent from the servers 19, to the network 19, to the cellular network 17, and to the vehicular telemetry hardware system 30.

In another embodiment of the invention, data and information may be sent from vehicular telemetry hardware system to an intelligent I/O expander 50, to an Iridum™ device, the satellite 13, the ground based station 15, the computer network 18, and to the servers 19. Computers 20 may access data and information on the servers 19. In another embodiment of the invention, data, information, and commands may be sent from the servers 19, to the computer network 18, the ground based station 15, the satellite 13, an Iridium device, to an intelligent I/O expander 50, and to a vehicular telemetry hardware system.

Vehicular Telemetry Hardware System

Figure 2:
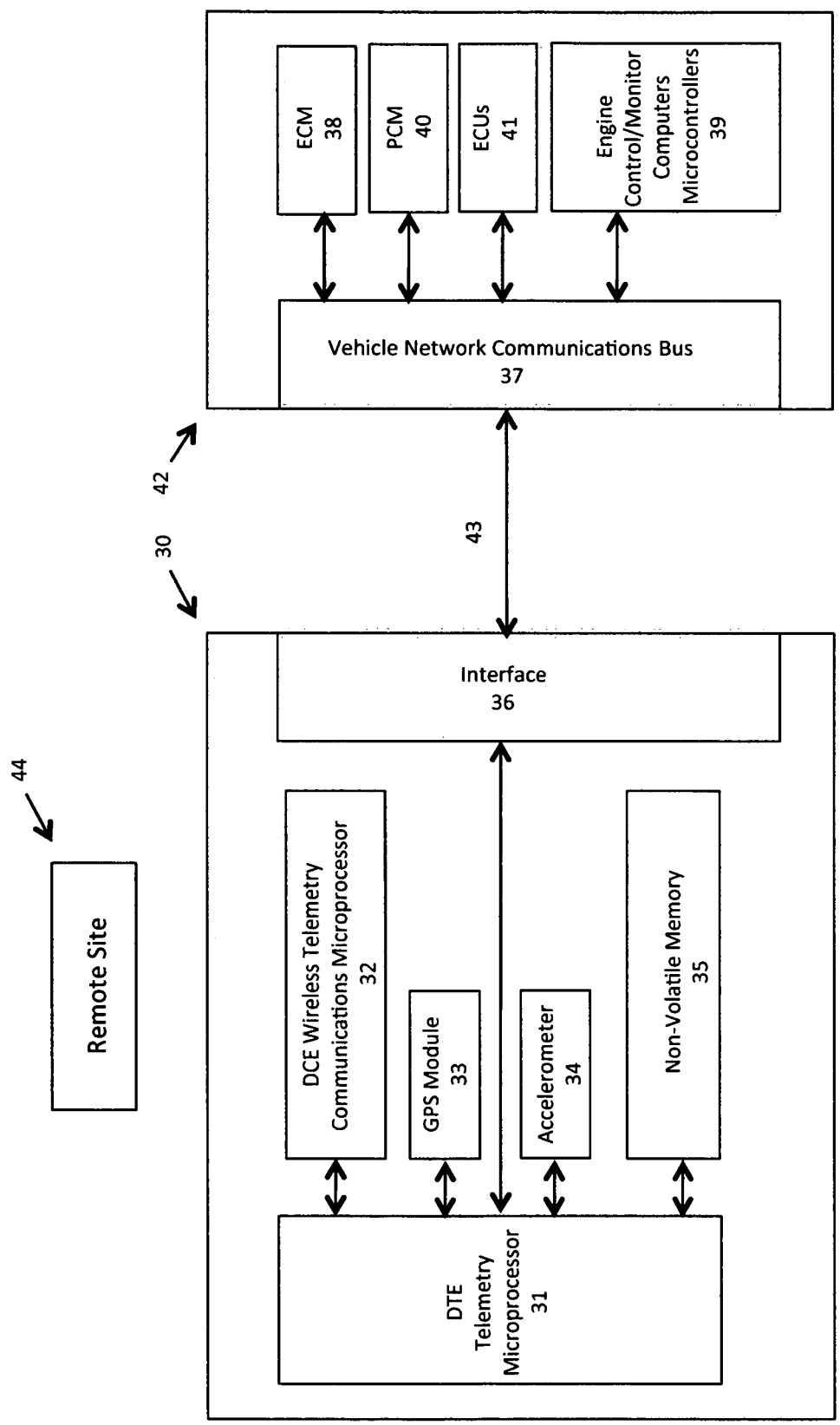
FIG. 2 is diagrammatic view of an vehicular telemetry hardware system including an on-board portion and a resident vehicular portion.

Referring now to FIG. 2 of the drawings, there is illustrated a vehicular telemetry hardware system generally indicated at 30. The on-board portion generally includes: a DTE (data terminal equipment) telemetry microprocessor 31; a DCE (data communications equipment) wireless telemetry communications microprocessor 32; a GPS (global positioning system) module 33; an accelerometer 34; a non-volatile memory 35; and provision for an OBD (on board diagnostics) interface 36 for connection 43 and communicating with a vehicle network communications bus 37.

The resident vehicular portion 42 generally includes: the vehicle network communications bus 37; the ECM (electronic control module) 38; the PCM (power train control module) 40; the ECUs (electronic control units) 41; and other engine control/monitor computers and microcontrollers 39.

While the system is described as having an on-board portion 30 and a resident vehicular portion 42, it is also understood that the present invention could be a complete resident vehicular system or a complete on-board system.

The DTE telemetry microprocessor is interconnected with the OBD interface 36 for communication with the vehicle network communications bus 37. The vehicle network communications bus 37 in turn connects for communication with the ECM 38, the engine control/monitor computers and microcontrollers 39, the PCM 40, and the ECU 41.

The DTE telemetry microprocessor has the ability through the OBD interface 36 when connected to the vehicle network communications bus 37 to monitor and receive vehicle data and information from the resident vehicular system components for further processing.

As a brief non-limiting example of vehicle data and information, the list may include: VIN (vehicle identification number), current odometer reading, current speed, engine RPM, battery voltage, engine coolant temperature, engine coolant level, accelerator peddle position, brake peddle position, various manufacturer specific vehicle DTCs (diagnostic trouble codes), tire pressure, oil level, airbag status, seatbelt indication, emission control data, engine temperature, intake manifold pressure, transmission data, braking information, and fuel level. It is further understood that the amount and type of vehicle data and information will change from manufacturer to manufacturer and evolve with the introduction of additional vehicular technology.

Continuing now with the DTE telemetry microprocessor 31, it is further interconnected for communication with the DCE wireless telemetry communications microprocessor 32. In an embodiment of the invention, an example of the DCE wireless telemetry communications microprocessor 32 is a Leon 100 commercially available from u-blox Corporation. The Leon 100 provides mobile communications capability and functionality to the vehicular telemetry hardware system 30 for sending and receiving data to/from a remote site 44. A remote site 44 could be another vehicle or a ground based station. The ground-based station may include one or more servers 19 connected through a computer network 18 (see FIG. 1). In addition, the ground-based station may include computer application software for data acquisition, analysis, and sending/receiving commands to/from the vehicular telemetry hardware system 30.

The DTE telemetry microprocessor 31 is also interconnected for communication to the GPS module 33. In an embodiment of the invention, an example of the GPS module 33 is a Neo-5 commercially available from u-blox Corporation. The Neo-5 provides GPS receiver capability and functionality to the vehicular telemetry hardware system 30.

The DTE telemetry microprocessor 31 is further interconnected with an external non-volatile memory 35. In an embodiment of the invention, an example of the memory 35 is a 32 MB non-volatile memory store commercially available from Atmel Corporation. The memory 35 of the present invention is used for data logging.

The DTE telemetry microprocessor 31 is further interconnected for communication with an accelerometer (34). An accelerometer (34) is a device that measures the physical acceleration experienced by an object. Single and multi-axis models of accelerometers are available to detect the magnitude and direction of the acceleration, or g-force, and the device may also be used to sense orientation, coordinate acceleration, vibration, shock, and falling.

In an embodiment of the invention, an example of a multi-axis accelerometer (34) is the LIS302DL MEMS Motion Sensor commercially available from STMicroelectronics. The LIS302DL integrated circuit is an ultra compact low-power three axes linear accelerometer that includes a sensing element and an IC interface able to take the information from the sensing element and to provide the measured acceleration data to other devices, such as a DTE Telemetry Microprocessor (31), through an I2C/SPI (Inter-Integrated Circuit) (Serial Peripheral Interface) serial interface. The LIS302DL integrated circuit has a user-selectable full scale range of +−2 g and +−8 g, programmable thresholds, and is capable of measuring accelerations with an output data rate of 100 Hz or 400 Hz.

In an embodiment of the invention, the DTE telemetry microprocessor 31 also includes an amount of internal memory for storing firmware that executes in part, the method of the present invention as well as other methods to operate and control the overall system. In addition, the microprocessor 31 and firmware log data, format messages, receive messages, and convert or reformat messages. In an embodiment of the invention, an example of a DTE telemetry microprocessor 31 is a PIC24H microcontroller commercially available from Microchip Corporation.

The vehicular telemetry hardware system 30 receives data and information from the resident vehicular portion 42, the GPS module 33, the accelerometer 43, and from configured intelligent I/O expanders 50. The data and information is stored in non-volatile memory 35 as a data log. The data log may be further transmitted by the vehicular telemetry hardware system 30 over the vehicular telemetry communication environment to the server 19 (see FIG. 1). The transmission may be controlled and set by the vehicular telemetry hardware system 30 at pre-defined intervals. The transmission may also be triggered as a result of a significant event such as an accident. The transmission may further be requested by a command sent from the application software running on the server 19.

Intelligent I/O Expander Hardware System

Figure 3:
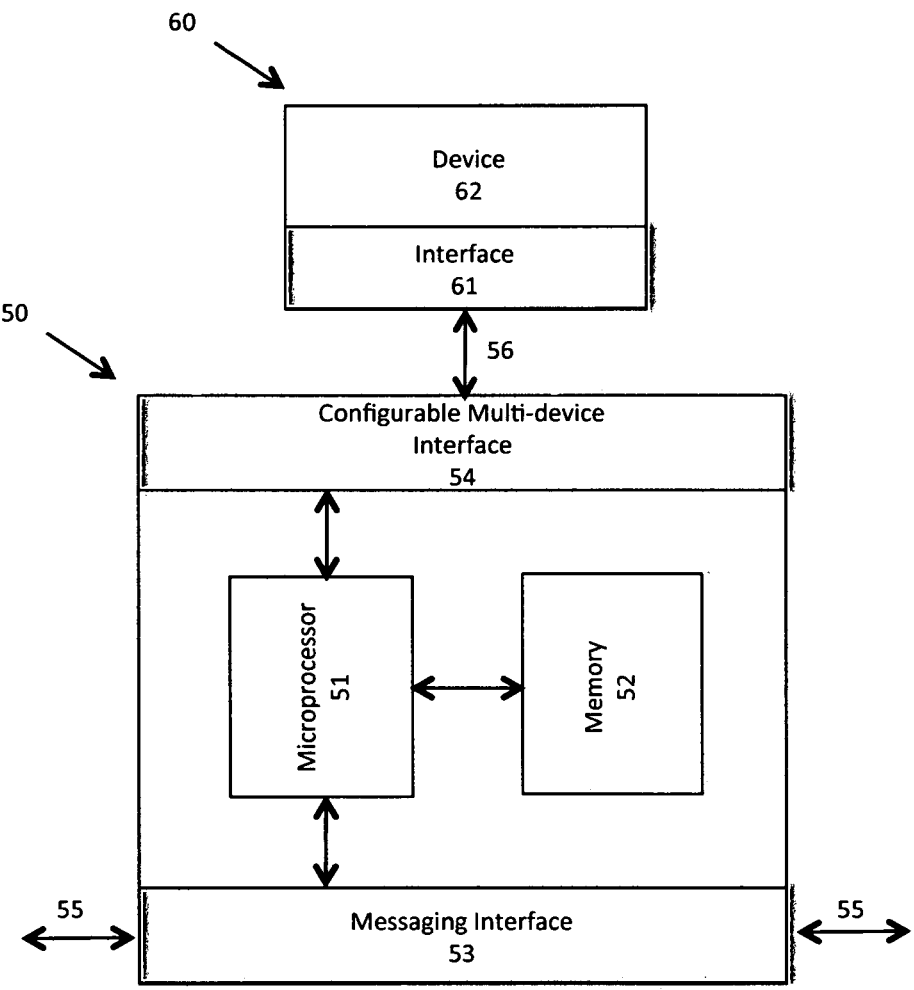
FIG. 3 is a diagrammatic view of an intelligent I/O hardware expander.

Referring now to FIG. 3 of the drawings, there is illustrated an intelligent I/O expander generally indicated at 50.

The intelligent I/O expander 50 includes a messaging interface 53 for a connection to a private bus 55 (in an embodiment of the invention, the private bus 55 is a cable connection, or private cable). The private bus 55 provides for connection to other intelligent I/O expanders (see FIG. 5) as well as the vehicular telemetry hardware system 30 (see FIG. 4). In an embodiment of the invention, the messaging interface 53 and private bus 55 is based upon a CAN bus. The messaging interface 53 includes five conductors. There are two power conductors (12-24 volts), a ground conductor, a CAN High conductor, and a CAN Low conductor.

Messaging on the private bus 55 is based upon a frame consisting of and ID and a varying number of data bytes. The ID portion may be 11 bits or 29 bits and the data may be zero to eight bytes of data. Messages may be sent over the private bus 55 when the bus is idle. The vehicular telemetry hardware system 30 and all intelligent I/O expanders 50 connected to the private bus 55 see all messages by monitoring the private bus 55. A message may be received by either the vehicular telemetry hardware system 30, or a particular intelligent I/O expander 50 based upon the ID contained in the frame. If the ID matches the particular device, then the device receives the message. The data portion of a message may contain data, information, or device commands.

In addition, the intelligent I/O expander 50 includes a configurable multi-device interface 54. The configurable multi-device interface 54 provides for connection to a multi-device bus 56 (in an embodiment of the invention, the multi-device bus 56 is a Geotab™ intelligent configuring cable connection). The multi-device bus 56 in turn provides connection to an interface 61 of a specific device 60. In an embodiment of the invention, the configurable multi-device interface 54 includes thirteen conductors. There are six conductors for bidirectional serial communication that include a data set ready (DSR) conductor, a clear to send (CTS) conductor, a transmit data conductor (TX), a data terminal ready (DTR) conductor, a request to send (RTS) conductor, and a receive data (RX) conductor. This grouping of conductors is for connecting to a first type of device, a device that requires serial communication. There are also four conductors, AUX1, AUX2, AUX3 and AUX4 for connecting auxiliary devices. This grouping of conductors is for connecting a second type of device (non-serial communication device). Finally, there are two ground conductors and one power conductor (12V). The conductors in association with a Geotab intelligent configuring cable are also used to establish the type of connection as a serial type or an auxiliaries type and identification of either AUX 1-4, or AUX 5-8. AUX 1-4 and AUX 5-8 provide conductors that may be monitored or driven between a high and low state to enable or disable a connected auxiliary. Monitoring or driving these conductors is dependent upon the particular auxiliary device connected to Aux 1-4 and AUX 5-8. Monitoring and driving these conductors also includes in an embodiment of the invention an auto adjust and resolution feature. For example, when a voltage level is between zero and five volts, a number of voltage steps may be associated with this range. When a voltage level is between zero and thirty volts, the number of voltage steps is adjusted for resolution for the larger range of voltages to avoid noise and extraneous data.

The intelligent I/O expander hardware system 50 also includes a microprocessor 51 and memory 52. Alternatively, the intelligent I/O expander hardware system 50 includes a microcontroller 51. A microcontroller includes a CPU, RAM, ROM and peripherals. Persons skilled in the art appreciate the term processor contemplates either a microprocessor and memory or a microcontroller in all embodiments of the disclosed hardware (vehicle telemetry hardware system 30, intelligent I/O expander hardware system 50, Bluetooth module 45 and Bluetooth beacon 21). The microprocessor 51 is also connected to the messaging interface 53 and the configurable multi-device interface 54. In an embodiment of the invention, a microcontroller 51 is an LPC1756 32 bit ARM Cortec-M3 device with up to 512 KB of program memory and 64 KB SRAM. The LPC1756 also includes four UARTs, two CAN 2.0 B channels, a 12 bit analog to digital converter, and a 10 bit digital to analog converter. In an alternative embodiment, the intelligent I/O expander hardware system 50 may include text to speech hardware and associated firmware (not illustrated) for audio output of a message to an operator of a vehicle 11.

The microprocessor 51, CAN 2.0 B controller, and firmware computer program stored in the program memory communicate with the messaging interface 53. The messaging interface 53 and private bus 55 may be monitored by the Can 2.0 B controller to send a message, ignore a sent message, or receive a message. For example, a message may be received by an intelligent I/O expander 56 when the message ID matches the expander ID.

The intelligent I/O expander 50 may be operated as a serial type in a passive expander mode or as an auxiliaries type in an active expander mode based upon an established configuration of the device.

Passive Expander Mode

A message received by the intelligent I/O expander 50 over the private bus 55 is converted or reformatted and sent from the intelligent I/O expander 50 to a first type of device connected to the configurable multi-device interface 54. This is accomplished by the microprocessor 51 and firmware computer program. This is a protocol conversion from the format and structure of the message on the private bus 55 to the requirements of a specific device connected by the multi-device bus 56.

Alternatively, a message received by the intelligent I/O expander 50 from a first type of device connected to the configurable multi-device interface 54 is converted or reformatted by the microprocessor 51 and firmware computer program, provided to the messaging interface 53, and sent over the private bus 55. This is a protocol conversion from the format and structure of the message for the requirements of the specific device 60 to the format and structure required by the private bus 55.

In the passive expander mode, the data portion of the message is passed through the intelligent I/O expander 50. The data could be passed through from the messaging interface 53 to the configurable multi-device interface 54, or from the configurable multi-device interface 54 to the messaging interface 53. The intelligent I/O expander 50 does not have any logic or control over a device 60, it performs a protocol conversion between interfaces. An example protocol conversion is from a CAN bus (private bus 55) to a serial bus (multi-device bus 56).

Active Expander Mode

In addition to the passive expander mode for the first type of device and serial communication with the intelligent I/O expander 50, there is also an active expander mode for a second type of device (auxiliaries type) and non-serial communication. The microprocessor 51 and firmware computer program monitor the configurable multi-device interface 54 and auxiliaries connected to the configurable multi-device interface 54. Data and information may be buffered in memory 52. The intelligent I/O expander 50 has logic and monitoring capability over the device 60 (auxiliaries). The intelligent I/O expander 50 also has logic and capability to communicate or signal a high or low state (on or off function) to enable or disable the associated device 60 (auxiliaries). When certain monitoring characteristics are met, the data and information may be formatted into a frame and a message containing the data may be sent over the private bus 55 to the vehicular telemetry hardware system 30. Alternatively, the frame and message may be sent to another intelligent I/O expander 50.

Devices

A number of difference specific devices 60 may be interfaced to the intelligent I/O expander 50. The configurable multi-device interface 54 may accommodate a number of different devices 62 and interfaces 61 through the configurable multi-device interface 54 and multi-device bus 56. When a specific device 60 is connected to the intelligent I/O expander 50, messages, data, or signals may be communicated between the device 62 and the intelligent I/O expander 50.

For example, if the specific device 60 is a Garmin™ type of GPS device 62 with the fleet management interface (FMI15 or FMI 45), the interface 61 to the Garmin device may be connected to the configurable multi-device interface 54 for communication with the intelligent I/O expander 50. In this case, the configurable multi-device interface has one end and configuration to the configurable multi-device interface 54 and a second end and configuration to the interface 61, in this example, a Garmin interface. A Geotab intelligent configuring cable provides a mapping of conductors between the interfaces.

The DTE telemetry microprocessor 31 and firmware computer program of the vehicular telemetry hardware system 30 includes the logic, commands, and protocol instructions for communicating with a Garmin device 62 for detecting the presence of the device. Otherwise, messages received by the vehicular telemetry hardware system 30 for a Garmin device are sent on the private bus 55 to an intelligent I/O expander that in turn converts or reformats the message and sends it to the Garmin device. The Garmin device is an example where the vehicular telemetry hardware system 30 is in a passive control mode. Aside from very basic logic, commands, and protocol instructions, the firmware does not have a full and complete set of logic and commands for the device. In this case, the full and complete set of logic and commands for the device resides in the MyGeotab application software on the server 19. Initialization of the intelligent I/O expander 50 and the vehicular telemetry hardware system 30 associate the intelligent I/O expander with the passive expander mode and the vehicular telemetry hardware system 30 with the passive control mode and device type.

As another example, if the specific device 60 is an Iridium™ type of satellite communications device 62, the interface 61 to the Iridium device 62 may also be interfaced to the configurable multi-device interface 54 by the multi-device bus 56 for communication with the intelligent I/O expander 50. In an embodiment of the invention, an Iridium 9602SBD may be connected to the intelligent I/O expander 50. The Iridium 9602SBD is a short burst data modem, or transceiver module designed for machine-to-machine solutions for sending and receiving packets of data. The interface includes a serial data interface, DC power input, network available output, and power on/off control line. In this case, the Geotab configurable multi-device cable 56 has one end and configuration to the configurable multi-device interface 54 and a second end and configuration to the interface 61, in this example, an Iridium interface.

The DTE telemetry microprocessor 31 and firmware computer program of the vehicular telemetry hardware system 30 includes the logic, commands, and protocol instructions for communicating with the Iridium device in order to send and receive messages (data and information) as well as control of the device. Example non-limiting commands include acquiring the satellite, authenticating the transceiver, sending messages, receiving messages, exchanging status information, and performing modem control. The firmware has a full and complete set of logic and commands for the device. This is an example where the vehicular telemetry hardware system 30 is in an active control mode. Initialization of the intelligent I/O expander and the vehicular telemetry hardware system 30 associate the intelligent I/O expander 50 with the passive expander mode and the vehicular telemetry hardware system 30 with the active control mode and device type.

Both the Garmin and Iridium devices are examples of a first type of device that requires serial communication for sending and receiving messages and device data. The server 19 and MyGeotab application program contain the logic and instructions for operating with a Garmin device. The DTE telemetry microprocessor 31 and firmware computer program of the vehicular telemetry hardware system 30 contain the logic and instructions for operating with the Iridium device. For example, the MyGeotab application program may create and send a command to a Garmin device. In this example, the message (including the command in the data) is provided to the vehicular telemetry hardware system 30 that converts or reformats the message to the private bus 55.

An intelligent I/O expander 50 receives the message, converts or reformats the message to the multi-device bus 56 where the Garmin device receives the command. As another example, the vehicular telemetry hardware system 30 may create and send a command to an Iridium device. In this example, a message (including the command in the data) is provided to the private bus 55. An intelligent I/O expander 50 receives the message, converts or reformats the message to the multi-device bus 56 where the Iridium device receives the command. Persons skilled in the art appreciate that a Bluetooth device may be connected and operated in a passive mode similar to the example description of a Garmin device, or that a Bluetooth device may be connected and operated in an active mode similar to the example description of an Iridium device.

As another example, the device 62 could be a series of temperature sensors that include an interface 61 and connected to the configurable multi-device interface 54 by another multi-device bus 56. This is an example of a second type of device, or non-serial communication device wherein the intelligent I/O expander 50 monitors the second type of device. The microprocessor 51 and firmware computer program of the intelligent I/O expander 50 contain the logic and instructions for monitoring and logging data with the auxiliaries. The server 19 and MyGeotab application program contain the logic and instructions for interpreting the logged data from the auxiliaries. The MyGeotab application program also contains an identification and mapping of each auxiliary device interfaced to the configurable multi-device interface 54 (Aux 1-4, Aux 5-8).

Persons skilled in the art will appreciate the invention may also include many other specific devices 60 for connection to the configurable multi-device interface 54. For example, Geotab specific devices, $3^{rd}$ party devices, additional vehicular sensors, smart phones, computers, analog I/O, digital I/O, driver identification, WiFi, 900 Mhz Aerocomm, and Bluetooth devices, Bluetooth modules 45 or Bluetooth beacons 21.

Figure 4:
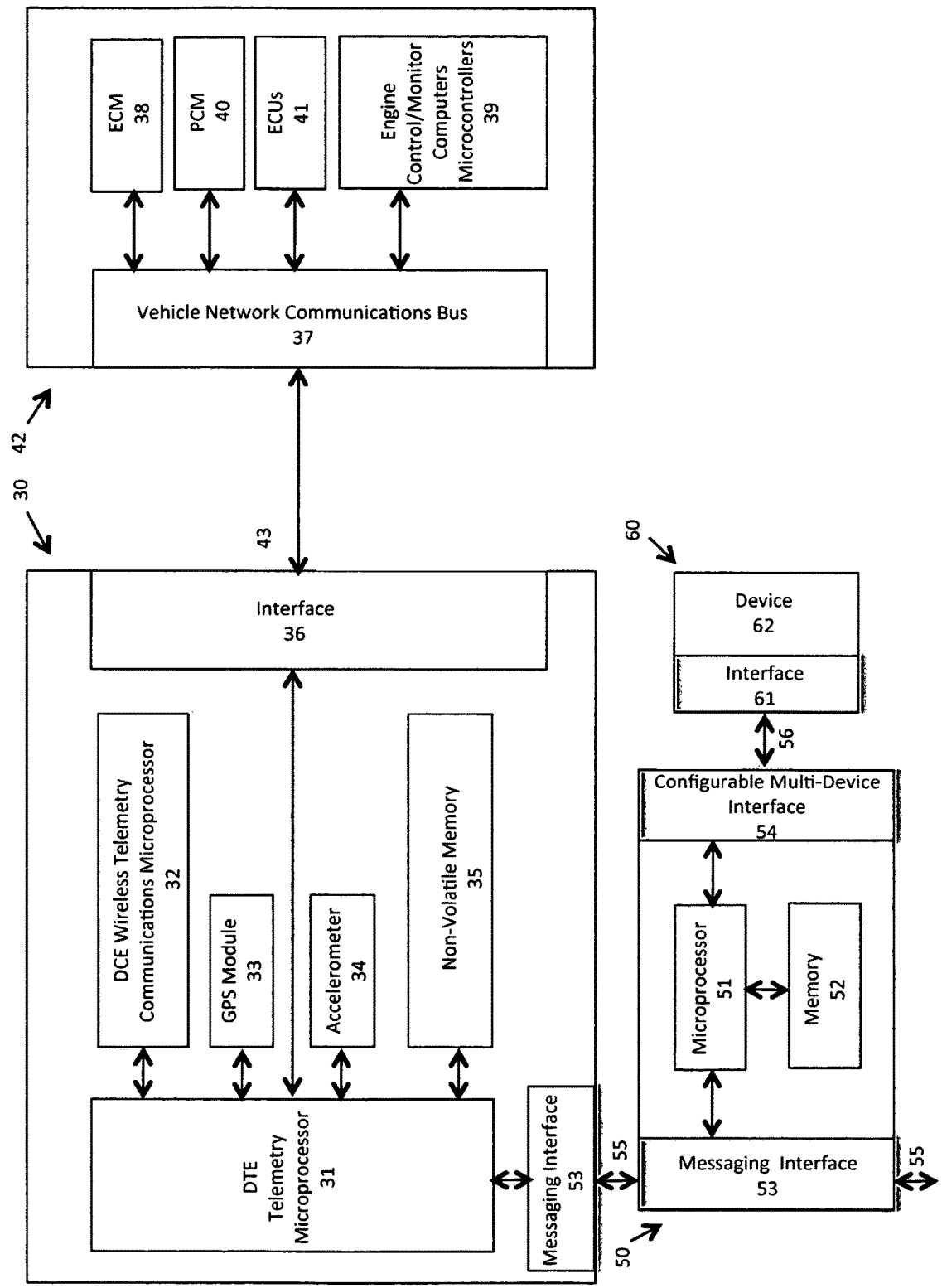
FIG. 4 is a diagrammatic view of an embodiment of the invention illustrating a vehicular telemetry hardware system directly interconnected to a first intelligent I/O expander.

Referring now to FIG. 4, an embodiment of the invention is further described. In this embodiment, the vehicular telemetry hardware system 30 includes a messaging interface 53. The messaging interface 53 is connected to the DTE telemetry microprocessor 31. In addition, a messaging interface 53 in an intelligent I/O expander 50 may be connected by the private bus 55. The private bus 55 permits messages to be sent and received between the vehicular telemetry hardware system 30 and the intelligent I/O expander, or a plurality of I/O expanders (see FIG. 5).

Figure 6:
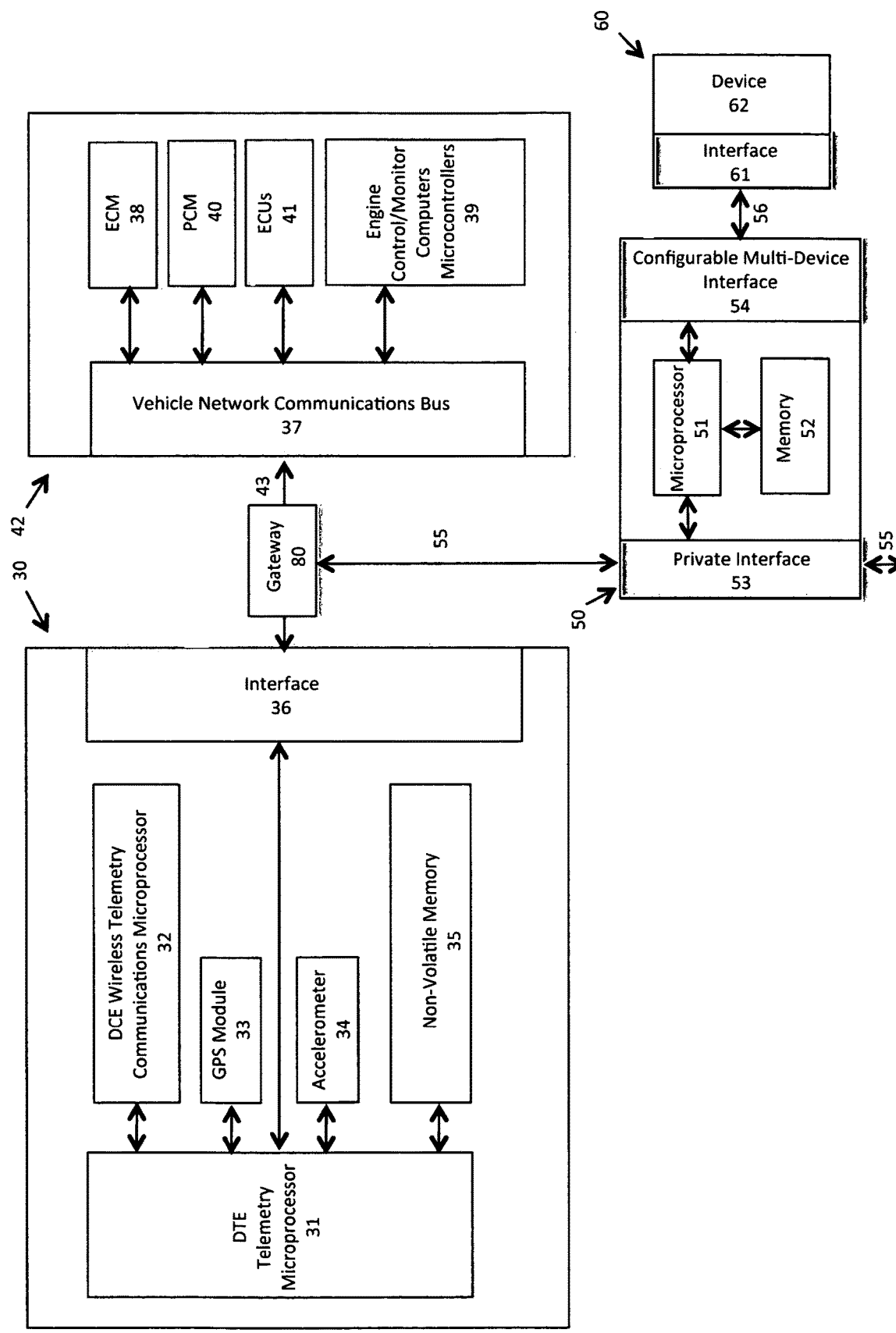
FIG. 6 is a diagrammatic view of an alternate approach illustrating a vehicular telemetry hardware system indirectly interconnected to a first intelligent I/O expander through a gateway.

Referring now to FIG. 6, an alternate embodiment of the invention is described. In this embodiment, the vehicular telemetry hardware system 30 is connected to the intelligent I/O expander through a gateway 80 on the vehicle connection 43. The vehicle connection 43 is a CAN bus providing communication between the vehicular telemetry hardware system 30 and the resident vehicular portion 42. The gateway 80 passes messages from the resident vehicular portion 42 to the vehicular telemetry hardware system 30, but does not allow messages from the vehicular telemetry hardware system 30 to be sent to the resident vehicular portion 42. However, the DTE telemetry microprocessor 31 is connected to the interface 36, the vehicle connection 43 and the gateway 80. The gateway monitors the vehicle connection 43 and permits messages to be sent from the DTE telemetry microprocessor 31 to the intelligent I/O expander over the private bus 55. In addition, the intelligent I/O expander may send messages over the private bus 55 to the gateway 80 and the gateway may pass the messages to the DTE telemetry microprocessor 31 by the vehicle connection 43 and the interface 36. The gateway 80 will not allow messages to be sent from the intelligent I/O expander 50 to the vehicle network communication bus 37 over the vehicle connection 43.

Figure 5:
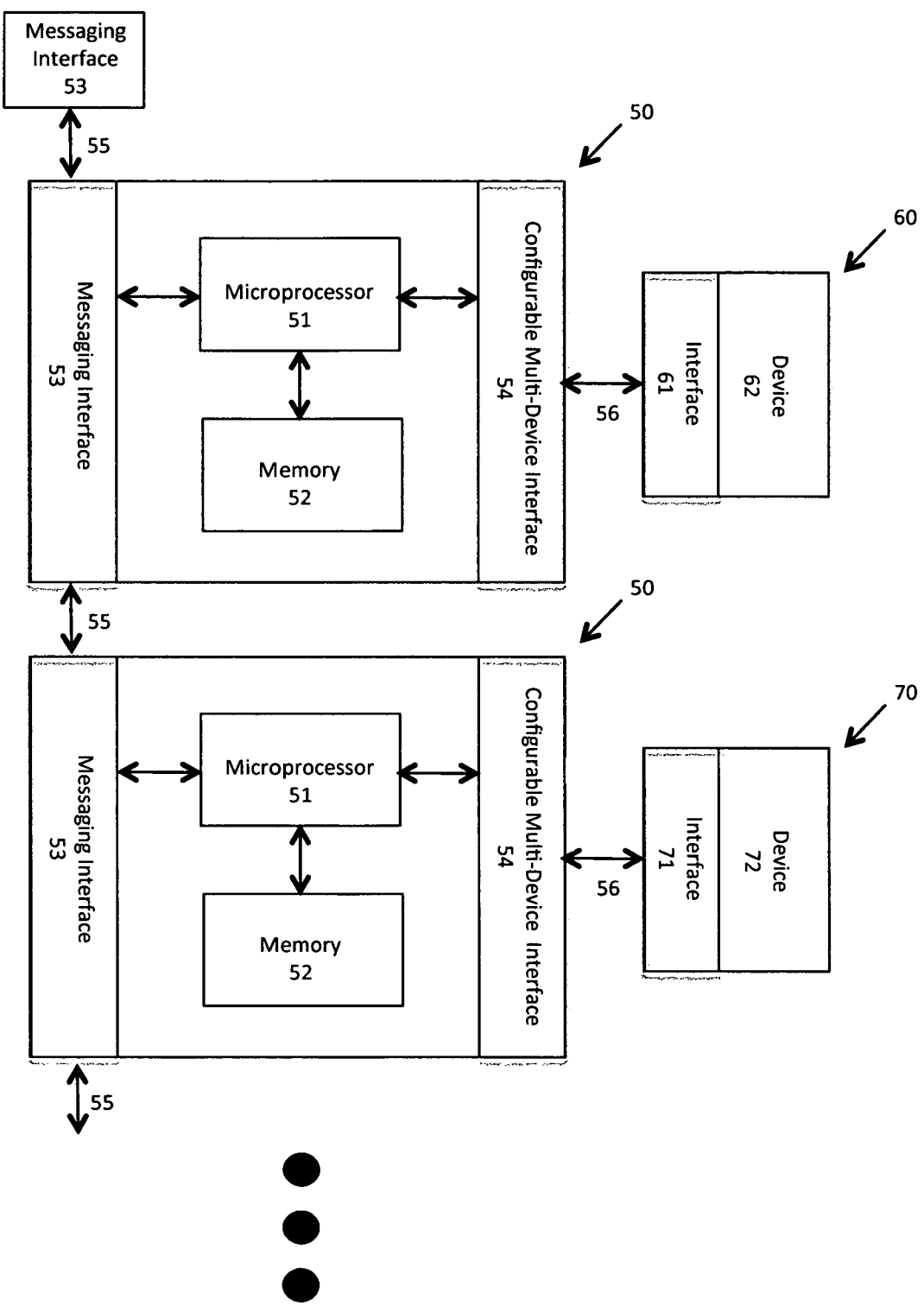
FIG. 5 is a diagrammatic view of a series of interconnected intelligent I/O hardware expanders.

Referring now to FIG. 5, multiple intelligent I/O expanders may be connected in a sequence and structure to each other. The private bus 55 is common to all intelligent I/O expanders and the vehicular telemetry hardware system 30. In addition, the vehicular telemetry hardware system 30 and each intelligent I/O expander 50 have the messaging interface 53. This permits a daisy chain like connection between the components for sending and receiving messages over the private bus 55. In an embodiment of the invention, up to eight intelligent I/O expanders may be connected to a vehicular telemetry hardware system. In another embodiment of the invention, up to two of the intelligent I/O expanders may be auxiliaries (AUX 1-4 and AUX 5-8). Optionally, the last intelligent I/O expander in the series may include a terminator connected to the last messaging interface 53 for noise suppression.

Telemetry Wireless Beacon Apparatus

The telemetry wireless beacon apparatus is initially described with reference to FIG. 1. The telemetry wireless beacon apparatus includes at least one Bluetooth module 45 or device and at least one Beacon module 21 or device. For example, current Bluetooth beacon technology is generally available from a number of companies to include Estimate, Gimbal™, Onyx Beacon and stickNFIND. The Beacon module 21 can periodically broadcast an identification and communicate 130 with a Bluetooth module 45 in the form of a message with a unique identifier. The Beacon module 21 may or may not include associated data with the broadcast. The associated data is dependent upon the application and capability of a particular beacon module 21. The firmware located with the beacon module 21 may be updated and programmed to accommodate a general application or a specific application such as a telemetry application or fleet management application.

Figure 7A:
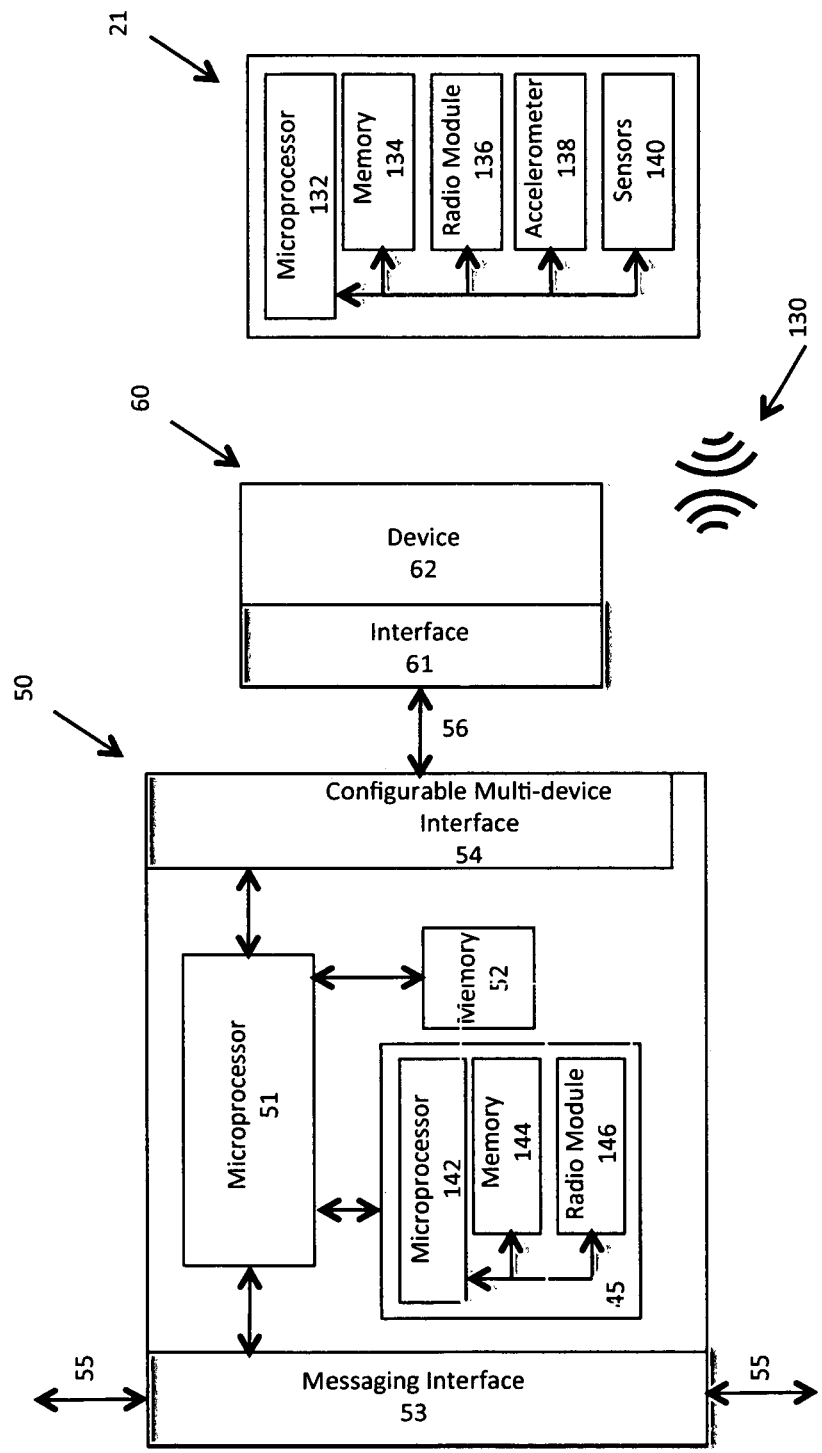
FIG. 7A is a diagrammatic view of an embodiment of the invention illustrating a Bluetooth module integrated with an intelligent I/O expander and capable of communication with a beacon module.

A first embodiment of the telemetry wireless beacon apparatus is described with reference to FIG. 7A. A beacon module 21 or device is generally indicated at 21. In an embodiment of the invention, the beacon module 21 includes a microprocessor 132, memory 134 and a Bluetooth radio module 136 with integral antenna. In another embodiment of the invention, the beacon module 21 may include an accelerometer 138. In another embodiment of the invention, the beacon module 21 includes sensors 140. In another embodiment of the invention, the beacon module 21 includes an accelerometer 138 and sensors 140. The memory 134 includes a memory for data and firmware to provide the associated logic to interact with the other components (radio module 136, accelerometer 138 and sensors 140) to perform the functionality and messaging of the beacon module 21. In further embodiments of the beacon module 21, the sensors 140 may include all or one of a temperature sensor, a light sensor, battery level sensor or a pressure sensor. Persons skilled in the art will appreciate that other sensors including user-defined sensors may be included with the beacon module 21.

In another embodiment of the invention, a Bluetooth module 45 is integrated with the intelligent I/O expander 50. An example Bluetooth module 45 is a Bluegiga BLE121LR integrated circuit with a connectivity range of 450 meters. The Bluetooth module 45 includes a microprocessor 142, memory 144 and a radio module 146. The memory 144 includes a memory for data and firmware to provide the associated logic to interact with the components (radio module 146 and intelligent I/O expander 50) to perform the functionality and messaging of the Bluetooth module 45. The Bluetooth module 45 or device may comprise a single integrated circuit or a chip set of components. The Bluetooth module 45 further communicates with the microprocessor 51 and messaging interface 53 of the intelligent I/O expander 50 for sending and receiving messages and data.

The beacon module 21 communicates 130 with the Bluetooth module 45 in the form of a broadcast message and the Bluetooth module 45 receives the broadcast message when the Bluetooth module is within a pre-defined range. The beacon module 21 communicates a unique identifier and associated data to the Bluetooth module. The associated data is dependent upon the type of sensors 140 associated with the beacon module 21 and may include accelerometer data, temperature data, illumination data, pressure data, battery data or other user-defined sensor data.

Figure 7B:
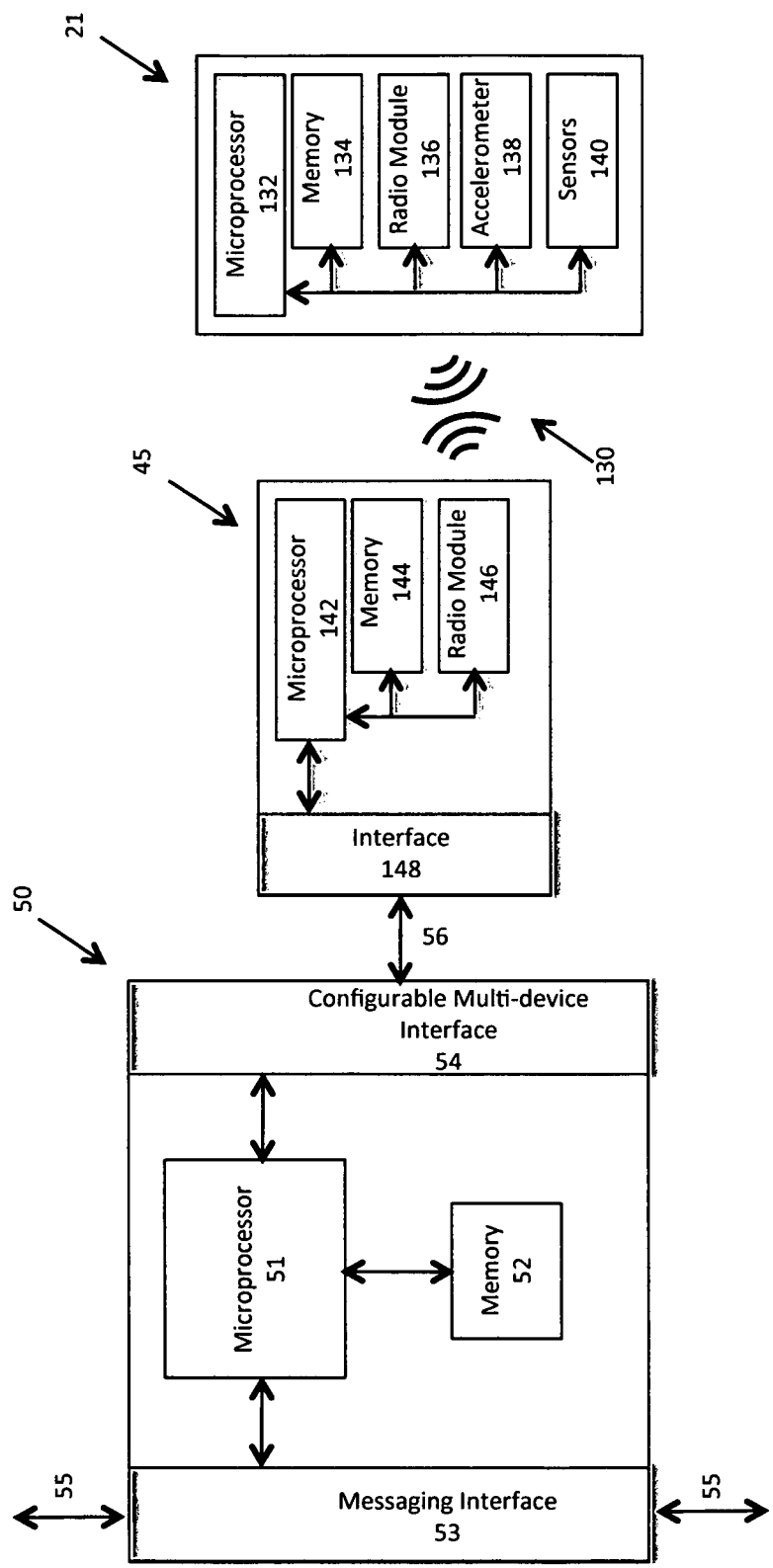
FIG. 7B is a diagrammatic view of another embodiment of the invention illustrating a Bluetooth module in the form of a device interconnected with an intelligent I/O expander and capable of communication with a beacon module.

Referring now to FIG. 7B, an alternative embodiment of the telemetry wireless beacon apparatus is described. With this embodiment, the Bluetooth module is a Bluetooth device external to the intelligent I/O expander 50. The Bluetooth device includes an interface 148. The interface 148 communicates with the configurable multi-device interface 54 of the intelligent I/O expander 50 through the multi-device bus 56. Persons skilled in the art appreciate the external Bluetooth device may be connected to an intelligent I/O expander 50 in either a passive mode or an active mode depending upon the module and application.

Figure 7C:
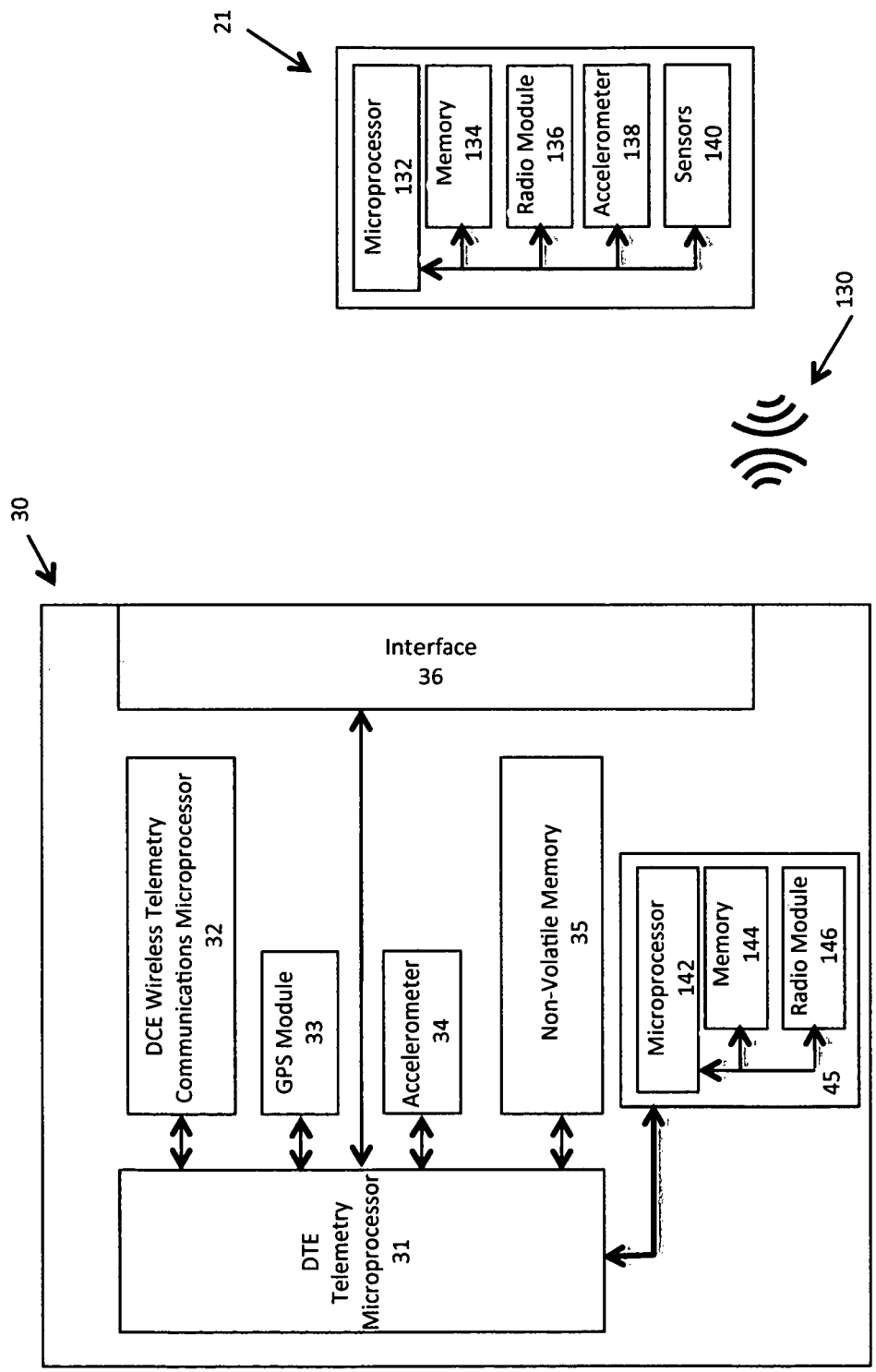
FIG. 7C is a diagrammatic view of another embodiment of the invention illustrating a Bluetooth module integrated with a vehicular telemetry hardware device and capable of communication with a beacon module.

Referring now to FIG. 7C, another alternative embodiment of the telemetry wireless beacon apparatus is described. With this embodiment, the Bluetooth® module 45 is integral with the vehicular telemetry hardware system 30. The Bluetooth module 45 communicates with the DTE Telemetry Microprocessor 31 for sending and receiving messages and data. The Bluetooth module 45 also receives broad cast messages from the beacon module 21.

In operation of these embodiments (FIGS. 7A, 7B and 7C), at least one Bluetooth beacon is associated with at least one object 22 relating to the vehicle 11. Non-limiting example objects include equipment, equipment associated with a minimum equipment list, sensitive equipment, sensitive objects 22 in transport by the vehicle 11, drivers of the vehicle 11, personnel around the vehicle 11, or objects 22 around the vehicle 11 Each object 22 associated with a Bluetooth beacon unique identifier and optionally the corresponding data is communicated wirelessly to the Bluetooth module 45 and stored in the memory 144 or alternatively the memory 52 or memory 35. Eventually, each unique identifier and associated data is communicated to the vehicular telemetry hardware system 30 through the messaging interface 53 and private bus 55 or directly into the memory 35 to form a log of data. Alternatively, the unique identifier may be filtered out to communicate only associated data of interest to the vehicular telemetry hardware system 30. Alternatively, the associated data may be filtered to communicate only associated data that is different from the last communication of the associated data. The vehicular telemetry hardware system 30 creates a log of unique identifiers and corresponding data. This log may include other data and information such as GPS coordinates, engine data and vehicle data such as speed, position and direction. The log, including the unique identifiers and/or associated data are communicated from the vehicular telemetry hardware system 30 over a network 18 to servers 19. After communication of a log of unique identifiers and/or associated data, the vehicular telemetry hardware system 30 initiates and creates a new log and the process to monitor and log data repeats. Persons skilled in the art appreciate that the embodiments of FIGS. 7A, 7B and 70 with respect to the location of the Bluetooth module 45 are generally applicable to the embodiments of FIGS. 2, 3, 4, 5, and 6 such that the location of the Bluetooth module 45 may be with the vehicular telemetry hardware system 30, the intelligent I/o expander 50 or a device 60.

Telemetry Wireless Beacon Methods

The telemetry wireless beacon monitoring, logging and communicating data method is described with reference to FIG. 17. Engine data, vehicle acceleration data and location data is either monitored, provided or received and logged by the vehicular telemetry hardware system 30. Engine data is monitored through the interface 36, vehicle acceleration data is provided by the accelerometer 34 and location data (latitude and longitude) is provided by the GPS module 33. In an embodiment of the invention, the Bluetooth module 45 disposed integral with the vehicular telemetry hardware system 30 provides Bluetooth beacon data. In an alternative embodiment of the invention, the Bluetooth module 45 disposed integral with or connected with an intelligent I/O expander 50 communicates monitored Bluetooth beacon data to the vehicular telemetry hardware system 30.

The engine is monitored through the interface and the vehicular telemetry hardware system 30 receives engine data. The accelerometer provides vehicle accelerometer data to the vehicular telemetry hardware system 30. The GPS provides GPS data to the vehicular telemetry hardware system 30. The Bluetooth module 45 also provides Bluetooth beacon 21 data to the vehicular telemetry hardware system 30. Persons skilled in the art appreciate that the monitoring, providing and receipt of data may be concurrent, sequential parallel or in any non-limiting order. The engine data, vehicle acceleration data, location data and Bluetooth beacon 21 data are retained in a log of data (memory 35) by the vehicular telemetry hardware system 30. The vehicular telemetry hardware system 30 may further communicate the log of data to a remote site 44 or remote devices and computers 20. Once the log of data has been communicated, the monitoring, receiving, providing and logging process continues with the next log of data.

The Bluetooth beacon 21 data includes a unique identifier and corresponding data. The unique identifier identifies each Bluetooth beacon 21. The corresponding data includes at least one of beacon accelerometer data, beacon temperature data, beacon illumination data, beacon pressure data, beacon battery level data and beacon user defined sensor data dependent upon the type of number of components integral or in communication with the Bluetooth beacon 21.

Figure 17:
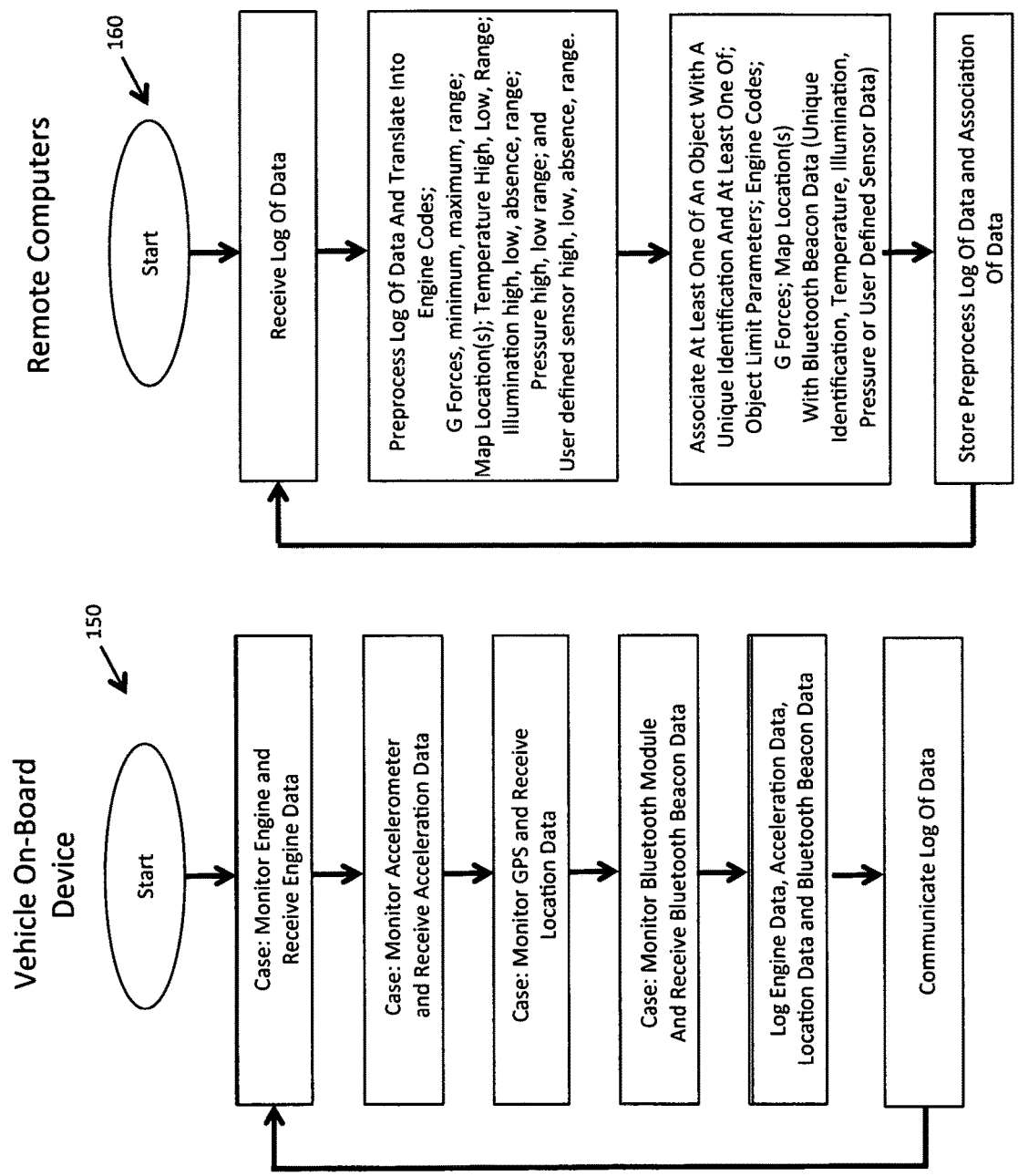
FIG. 17 is a diagrammatic view of a vehicle on-board device firmware method to monitor, receive, log and communicate data to a remote device that may receive, preprocess and associate data from the log of data.

The remote computer preprocessing method is described also with reference to FIG. 17. A remote computer and application software, for example the MyGeotab software application receives, or has access to, the communicated log of data from the vehicular telemetry hardware system 30. The log of data received from the vehicular telemetry hardware system 30 is in the form of raw data. A first preprocessing step occurs to translate or convert the data into a more useful form. For example, raw engine data into engine codes; raw vehicle accelerometer data into G forces, minimal G forces, maximum G forces and a range of G forces; raw beacon temperature data into a low, a high and range of temperatures; raw beacon illumination data into a low, a high, and absence of light or a range of light; raw beacon pressure data into a low, a high or a range of pressures; and raw beacon user defined sensor data into a low, a high, an absence or range of information.

A second preprocessing step occurs to associate at least one of the translated data such as engine codes; speed; G forces; or map location(s) with each unique Bluetooth beacon 21 identifier and corresponding data such as beacon temperature, beacon illumination, pressure or beacon user defined sensor data. Each Bluetooth beacon 21 identifier may be further associated with each object 22.

The preprocessing method concludes by storing the preprocessed log of data including the translations or conversions and associations. The preprocessing method repeats for each receipt of a log of data from the vehicular telemetry hardware system 30.

Figure 18:
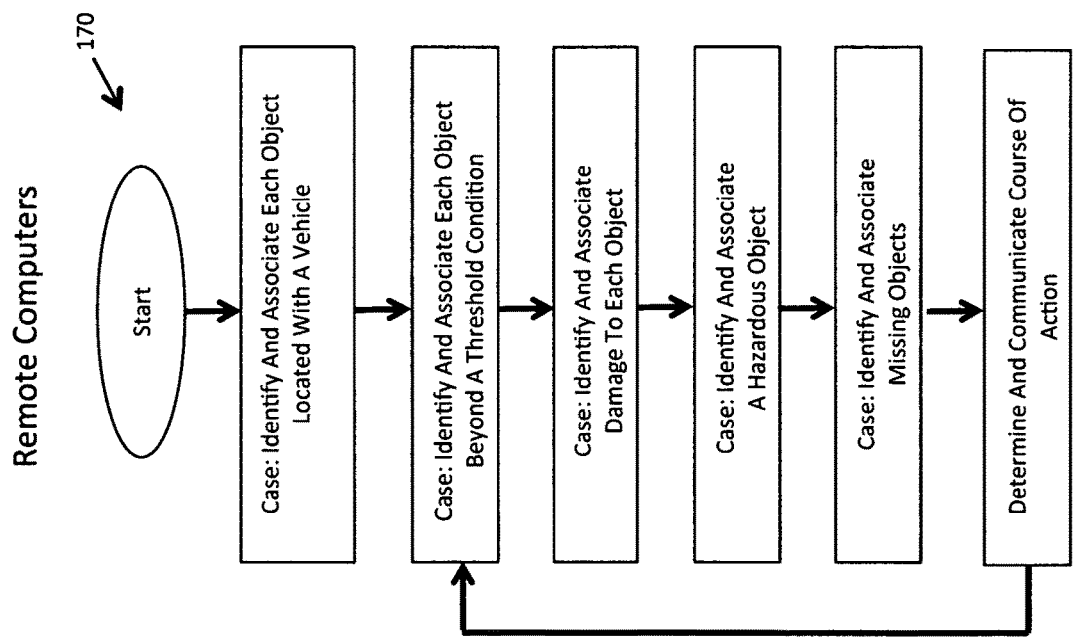
FIG. 18 is a diagrammatic view of a remote device method to identify and associate different object conditions and corrective action determination.

The remote computer Bluetooth beacon fleet management method is described with reference to FIG. 18. A remote computer and application software, for example the MyGeotab software application receives, or has access to, over a communications network such as the Internet, the preprocessed log of data. Alternatively, the MyGeotab software application receives, or has access to the log of data. In an embodiment of the invention, the Bluetooth beacon fleet management method includes a step of identifying and associating objects 22 located or associated with a vehicle 11. Alternatively, this step may be included in the preprocessing method. In addition, the Bluetooth beacon fleet management method has access to thresholds and ranges relating to each Bluetooth beacon 21 and corresponding object 22. For example, these thresholds and ranges may include acceptable conditions and unacceptable conditions in the area of G forces, map locations (geofencing), temperatures, pressures and user-defined sensor limits.

A first case involves the step of identifying and associating each object with a vehicle beyond a threshold condition. Each Bluetooth beacon 21 will broadcast a message with the unique identification, and optionally data. The Bluetooth module 45 may receive the broadcast message when the module is within a range, for example, of 450 meters. That may introduce erroneous results for objects close to a vehicle but not necessarily with or associated with a vehicle 11. At least one of a Bluetooth signal strength, location information, geofencing information or relative speed of a vehicle 11 compared to thresholds provide a determination of each object located with a vehicle 11. The outcome of this step is an accurate identification of each object having a Bluetooth beacon 21 with each vehicle 11. Objects 22 may be determined as located with a vehicle 11. This involves identifying a beacon unique identifier disposed with an object and the initial vehicle 11 location. Then, the beacon unique identifier is identified at a second vehicle 11 location where the second vehicle location is determined by one of a vehicle speed or motion, vehicle distance vehicle location or a geofence event. When a beacon unique identifier is determined at the second vehicle location, an accurate number of objects disposed or associated with the vehicle 11 are determined. This method occurs for each beacon unique identifier and associated object 22. In addition, the accurate number of objects may be further assessed at a third vehicle location or geofence to determine if there is a missing object condition when a beacon unique identifier is absent at the third vehicle location or geofence.

A second case involves the step of identifying and associating damage to an object. G force thresholds can be compared to beacon G force data to determine if an object has sustained damage, for example when dropped. Temperature thresholds can be compared to beacon temperature data to determine if an object has sustained damage, for example when too cold or too hot or out of an acceptable temperature range for a period of time. Light thresholds can be compared with beacon illumination data to determine if an object has been over exposed or under exposed to light. Pressure thresholds can be compared to beacon pressure data to determine if an object has sustained damage, for example with too much or too little pressure. User defined thresholds can also be compared to beacon user defined sensor data. When the corresponding data exceeds a damage threshold such as a range, or upper limit or lower limit or combination of range and limits, or time based limit, then a damaged object condition is determined. The method involves accessing the preprocessed telemetry log of telemetry data to identify a beacon unique identifier and beacon data. Then, comparing the beacon data with the threshold data and when the beacon data is beyond a damage threshold value or a damage limit value, indicate the object is damaged. Damage threshold values and limits include G forces, temperatures, pressures or user defined values.

A third case involves the step of identifying and associating hazardous objects with a potential dangerous condition. G force thresholds, or temperature thresholds or light thresholds or pressure thresholds or user defined thresholds can be compared to the corresponding data. When the corresponding data exceeds a hazardous threshold, a range or upper limit or lower limit or combination or range and limits, or time based limit, a hazardous object condition is determined. The method involves accessing the preprocessed telemetry log of telemetry data to identify a beacon unique identifier and beacon data. Then, comparing the beacon data with the threshold data and when the beacon data is beyond a hazardous threshold value or a hazardous limit value, indicate the object is hazardous. Hazardous threshold values and limits include G forces, temperatures, pressures or user defined values.

A forth case involves the step of identifying and associating each object with a vehicle beyond a threshold condition. Each Bluetooth beacon 21 will broadcast the unique identification, and optionally data. The Bluetooth module 45, when the module is within a range, for example, of 450 meters may receive the broadcast message. At least one of a Bluetooth signal strength, location information, geofencing information or relative speed of a vehicle 11 compared to thresholds provide a determination of each object located with a vehicle 11. The outcome of this step is an accurate identification of each object having a Bluetooth beacon 21 with each vehicle 11 compared to a minimum equipment or minimum object list. When the corresponding data does not equate to a minimum equipment or minimum object list, a missing item condition is determined.

Persons skilled in the art appreciate that the four cases may be executed in parallel, a sequence or concurrently. Once a damaged object condition, or a hazardous object condition or missing item condition is determined, then a course of corrective action is communicated as a message to a computer 20, a compliance report, a management report or an audio message to an operator of a vehicle 11 through a text to speech capable intelligent I/O expander 50.

Intelligent I/O Expansion System Methods

The DTE telemetry microprocessor 31, firmware computer program, and memory 35 include the instructions, logic, and control to execute the portions of the method that relate to the vehicular telemetry hardware system 30. The microprocessor 51, firmware computer program, and memory 52 include the instructions, logic and control to execute the portions of the method that relate to the intelligent I/O expander 50 as well as the logic and control to execute portions of the method that relate to the Bluetooth module 45.

Figure 8:
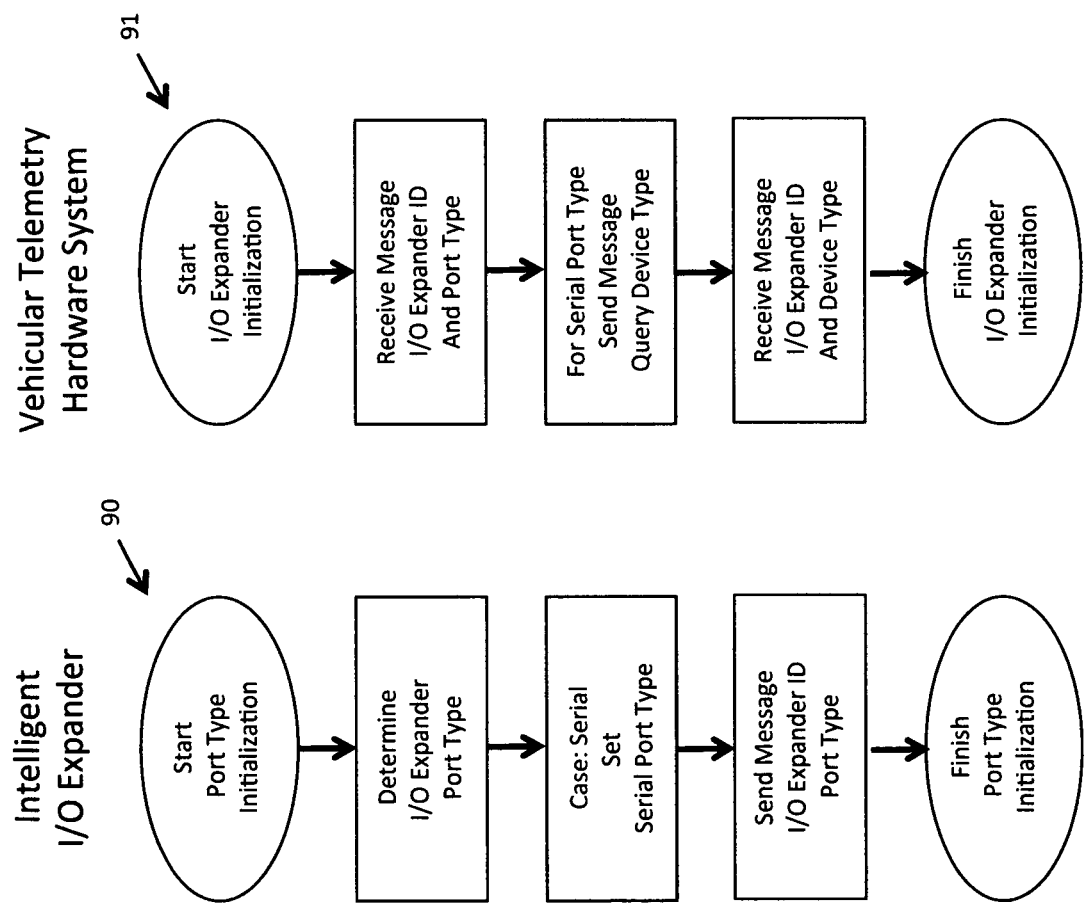
FIG. 8 is a high level flowchart for initialization of an intelligent I/O expander and a vehicular telemetry hardware system for the case of an I/O expander configured as a serial port type.

Referring now to FIG. 8, an initialization method of the intelligent I/O expander 50 and the vehicular telemetry hardware system 30 is described with respect to a first case (serial port type detected). The initialization for the intelligent I/O expander 50 is generally indicated at 90.

The initialization method 90 starts with determining the I/O expander port type (either serial port type or auxiliaries port type). In an embodiment of the invention, if there is no short between the RX and TX conductors, and there is no short between the CTS and RTS conductors, then the port is determined to be a serial port type. This is accomplished by the firmware sensing the conductors in the configurable multi-device interface 54 and checking for shorted conductors. For this case, set the port type to serial and set the state or mode to passive expander mode. Send a message over the private bus 55 to the vehicular telemetry hardware system ID with the I/O expander ID and an indication that the port type is serial. This message will be received by the vehicular telemetry hardware system 30. This informs the vehicular telemetry hardware system 30 that an intelligent I/O expander with a particular ID number is configured as a serial port type in a passive expander mode.

The initialization method for the vehicular telemetry hardware system 30 is generally indicated at 91. This initialization method 91 receives a message from the I/O expander 50 over the private bus 55. The message includes an I/O expander ID and an indication to the port type, in this first case a serial port type in a passive expander mode. The vehicular telemetry hardware system 30 sends a message to the I/O expander ID that will query the device type connected to the intelligent I/O expander 50. The intelligent I/O expander 50 will convert or reformat the message received on the private bus 55 and pass the message to the device 62 over the multi-device bus 56. The device 62 will identify itself and send back a message to the intelligent I/O expander 50 over the multi-device bus 56. The intelligent I/O expander 50 in turn will convert or reformat this message and send the message over the private bus 55. The vehicular telemetry hardware system 30 will receive the message with the I/O expander ID and the device type.

The query of the device type may occur in a number of different ways. For example, if the vehicular telemetry hardwire system is looking to determine if a Garmin device 62 is connected to an intelligent I/O expander 50, then the message to the intelligent I/O expander 50 is based upon the Garmin protocol to detect the presence of a Garmin device. If a Garmin device is connected, then the Garmin device will send back a message indicating a Garmin device is present. If a Garmin device is not present, there will not be any message sent back and a time out will occur. Assuming a Garmin device is detected, and then the vehicular telemetry hardware system 30 is set to a passive control mode. The Garmin device is an example of a passive control device and persons skilled in the art will appreciate that other types of devices may also be included in the passive control mode. A Garmin like query and response may also occur for the case of a Bluetooth module 45 connected to an intelligent I/O expander 50 interface in a passive control mode.

As another example, if the vehicular telemetry hardware system is looking to determine if an Iridium device 62 is connected to an intelligent I/O expander 40, then the message is based upon the Iridium modem protocol to detect the present of an Iridium device. If an Iridium device is connected, the Iridium device will send back a message indicating an Iridium device is present. If an Iridium device is not present, there will not be any message sent back and a time out will occur. Assuming an Iridium device is detected, and then the vehicular telemetry hardware system 30 is set to an active control mode. The Iridium device is an example of an active control device and persons skilled in the art will appreciate that other types of devices may also be included in the active control mode. An Iridium like query and response may also occur for the case of a Bluetooth module 45 connected to an intelligent I/O expander 50 interface in an active control mode.

The method for the vehicular telemetry hardware system 30 continues through a list of potential serial devices until the list has been completed. The vehicular telemetry hardware system 30 may also periodically check for additional intelligent I/O expanders 50 to ensure expanders later added are identified and configured.

In addition, while the vehicular telemetry hardware system 30 firmware may contain the necessary instructions, logic and protocol for devices like Garmin, Iridium and Bluetooth, additional instructions, logic, and protocols may be provided to the firmware, or received by the vehicular telemetry hardware system 30 in real time by sending from the server 19 the associated logic and firmware for storage in the memory 35 of the vehicular telemetry hardware system 30.

Figure 10:
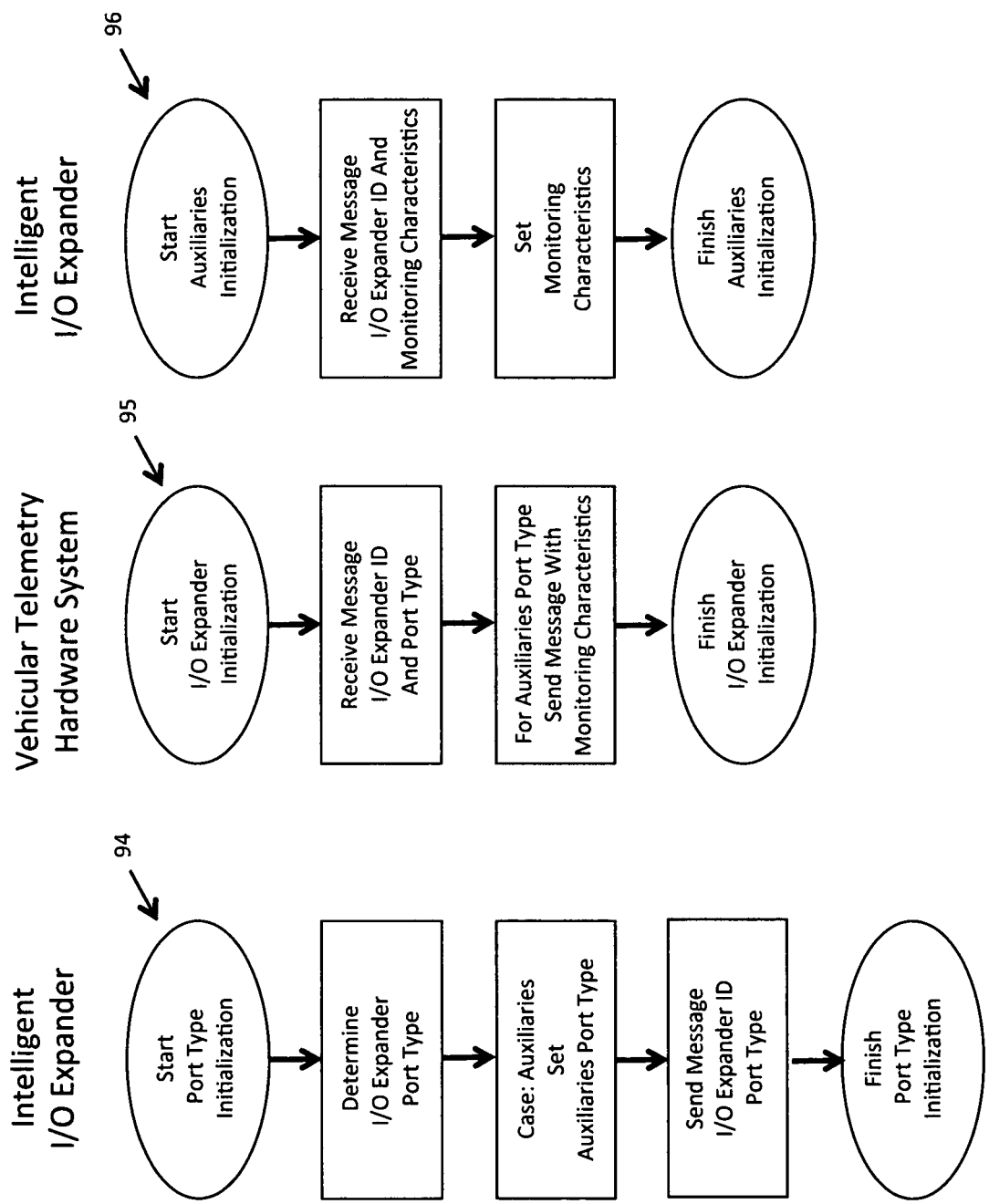
FIG. 10 is a high level flow chart for initialization of an intelligent I/O expander and a vehicular telemetry hardware system for the case of an I/O expander configured as an auxiliaries port type and active expander mode.

Referring now to FIG. 10, the initialization method of the intelligent I/O expander 50 and the vehicular telemetry hardware system 30 is further described with respect to a second case. The second case initialization for the intelligent I/O expander 50 is generally indicated at 94.

The initialization method 94 starts with determining the I/O expander port type (either serial or auxiliaries). In an embodiment of the invention, if there is a short between the RX and TX conductors, then aux 1-4 has been detected. In an embodiment of the invention, if there is a short between the CTS conductor and the RTS conductor, then aux 5-8 has been detected. The microprocessor 51 and firmware computer program in the intelligent I/O expander 50 sense the conductors and determine if there is a short between conductors. This provides for detecting the configuration of the port as either AUX 1-4 or AUX 5-8 to the vehicular telemetry hardware system ID. For this case, set the port type to aux 1-4 or aux 5-8 and set the state or mode to active expander mode. Send a message over the private bus 55 with the I/O expander ID and indicate the port type as either aux 1-4 or aux 5-8. This message will be received by the vehicular telemetry hardware system 30. This informs the vehicular telemetry hardware system 30 that an intelligent I/O expander with a particular ID number is configured as an auxiliaries device and AUX 1-4 or AUX 5-8.

The initialization method for the second case of the vehicular telemetry hardware system 30 is generally indicated at 95. This initialization method 95 receives a message from the I/O expander 50 over the private bus 55. The message includes an I/O expander ID and an indication to the port type as either aux 1-4 or aux 5-8. Since this is recognized as an active expander mode, the vehicular telemetry hardware system 30 sends a message to the I/O expander ID that includes monitoring characteristics for the intelligent I/O expander 50.

The intelligent I/O expander 50 receives the message from the vehicular telemetry hardware system 30 over the private bus 55 and starts the auxiliaries initialization generally indicated at 96. The message includes the I/O expander ID and the specific monitoring characteristics for the intelligent I/O expander 50. The intelligent I/O expander 50 then sets the monitoring characteristics for the auxiliaries connected to the configurable multi-device interface 54. Monitoring characteristics are not limited to but may include thresholds and changes in values.

The vehicular telemetry hardware system 30 and each intelligent I/O expander 50 connected to the system complete the initialization methods previously described with reference to FIG. 8 and FIG. 10 to determine what devices are connected to what intelligent I/O expanders 50, to set the I/O expander mode (passive or active), and to set the vehicular telemetry hardware system mode (active control or passive control), and to associate IDs in the system.

In an embodiment of the invention, there is a cabling technique for connecting each device 62 and interface 61 to the configurable multi-device interface 54. For the case with serial devices, the conductors required for serial communication at the configurable multi-device interface 54 are mapped by a Geotab intelligent configuring cable and provided to the interface 61. This may vary from specific device 60 to specific device 60. This also provides an interfacing capability, for example between and intelligent I/O expander 50 and a Garmin device, or an intelligent I/O expander 50 and an Iridium device, or an intelligent I/O expander 50 and a Bluetooth device.

In addition, the cabling technique also identifies the port type of serial or auxiliaries (AUX 1-4, AUX 5-8). For example, if the Geotab intelligent configuring cable internally shorts the RX and TX conductors of the serial interface conductors, then AUX 1-4 is established on the AUX conductors. As another example, if the Geotab intelligent configuring cable internally shorts the CTS and RTS conductors of the serial interface conductors, then an AUX 5-8 is established on the AUX conductors. Persons skilled in the art will appreciate that other techniques may be applied to identify the port type of serial or auxiliaries (AUX 1-4 and AUX 5-8).

Figure 9:
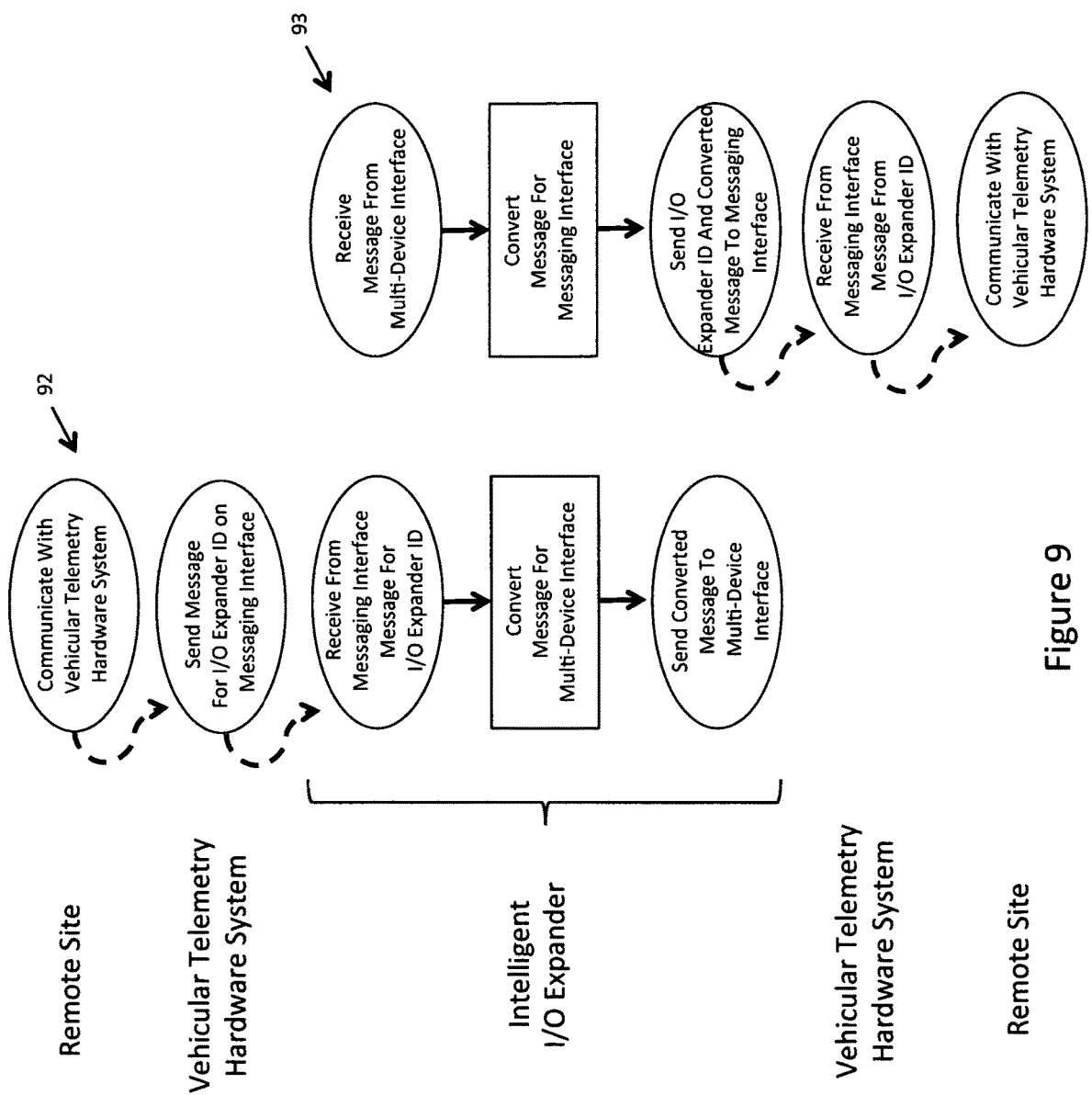
FIG. 9 is a high level flowchart for communication within the system for the case of an I/O expander configured as a serial port type.

The method and operation of the intelligent I/O expander 50 for the case of a serial port type is now described with reference to FIG. 9. Communication to a device attached to an intelligent I/O expander 50 is generally indicated at 92. Communication may either begin at a remote site or device (server 19) where a message is sent to the vehicular telemetry hardware system 30 that in turn is received by the vehicular telemetry hardware system 30. Alternatively, a message may be generated by the vehicular telemetry hardware system 30. The vehicular telemetry hardware system 30 may send a message to an intelligent I/O expander 50 with an I/O expander ID and message on the private bus 55 through the messaging interface 53. The intelligent I/O expander 50 receives the message (ID's match) from the messaging interface 53 including the I/O expander ID and message. The intelligent I/O expander converts or reformats the message for the device associated with the configurable multi-device interface 54 and sends the message to the multi-device interface 54. A specific device 60 (for example Garmin or Iridium) receives the message through the interface 61.

Communication from a specific device 60 connected to an intelligent I/O expander 50 is generally indicated at 93. Communication may also begin with the specific device 60. A specific device 60 may send a message to the intelligent I/O expander 50 on the multi-device bus 56 and to the configurable multi device interface 54. The intelligent I/O expander 50 will receive and convert or reformat the message for the messaging interface 53. The intelligent I/O expander 50 will send the I/O expander ID and message through the messaging interface 53 to the private bus 55. The vehicular telemetry hardware system 30 receives the message from the messaging interface 53 with the I/O expander ID and message. The vehicular telemetry hardware system 30 may either log the data from the received message, or it may communicate the received message or data to a remote site (server 19) for further processing.

When the microprocessor 51 and firmware computer program convert or reformat messages, it may take several messages and reformatting of the messages. For example, in an embodiment of the invention, messages received over the private bus 55 have a data limitation of up to eight bytes. It may take several messages over the private bus 55 in order to receive the required data for sending to a specific device 60. In this case, messages received over the private bus 55 may be buffered in memory 52. Then, the data buffered in memory 52 may be reformatted to create a message for sending over the multi-device bus 56. Alternatively, messages received over the multi-device bus 56 may be buffered in memory 52 and subsequently reformatted to create a message, or multiple messages for sending over the private bus 55. The firmware computer program contains the instructions and logic for converting and reformatting messages between the two busses. Alternatively, several messages containing partial information may be sent directly if system speed permits sending partial information sequentially.

Figure 11:
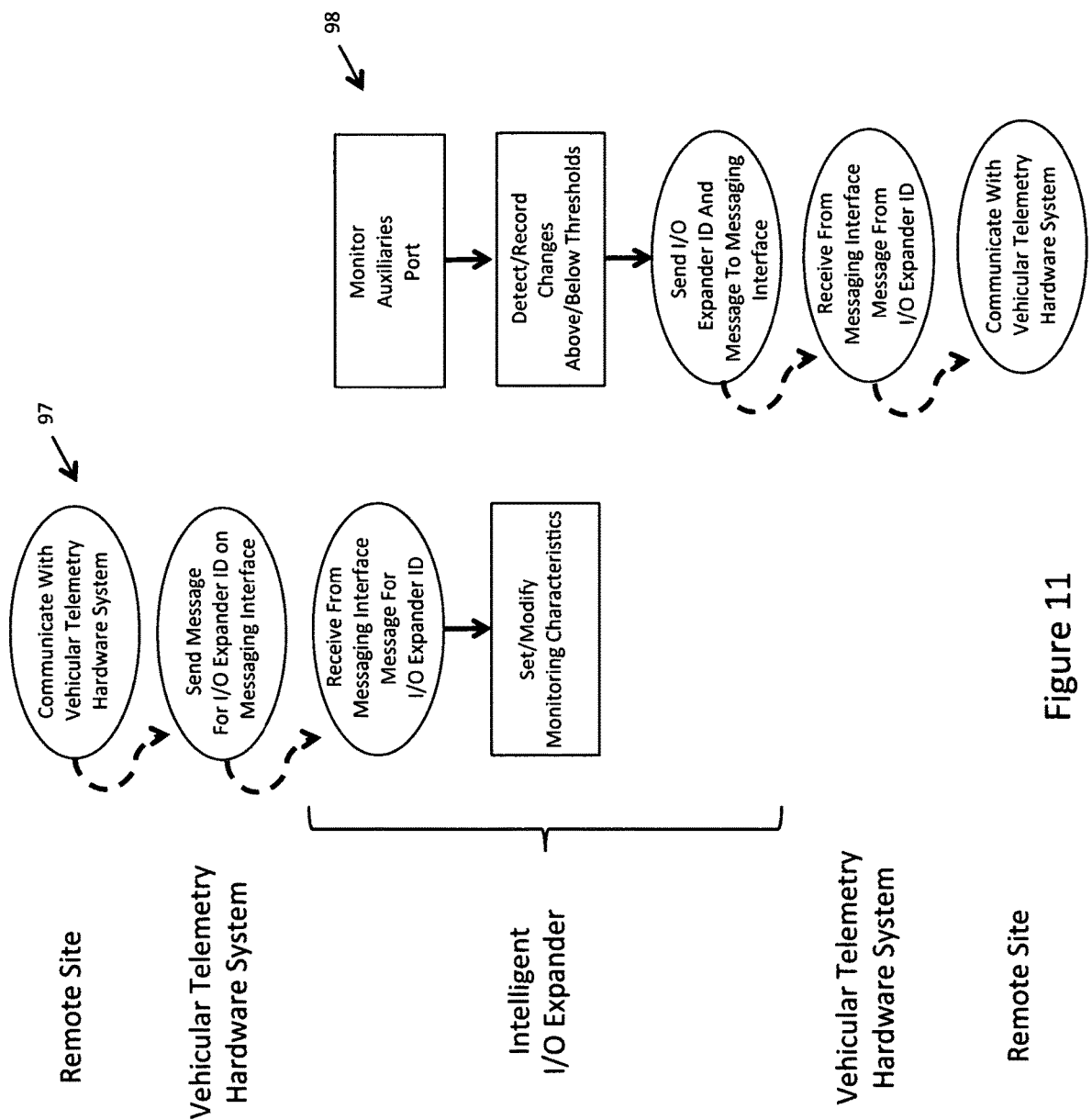
FIG. 11 is a high level flow chart for communication within the system for the case of an I/O expander configured as an auxiliaries port type and active expander mode.

Operation for the case of an auxiliaries port type is now described with reference to FIG. 11. Communicating with an intelligent I/O expander 50 is generally indicated at 97. Communication may either begin at a remote site (server 19) where a message is sent to the vehicular telemetry hardware system 30, which in turn is received by the vehicular telemetry hardware system 30, or a message may be generated by the vehicular telemetry hardware system 30. The vehicular telemetry hardware system 30 may send a message to an I/O expander with an I/O expander ID and message on the messaging interface 53. The intelligent I/O expander will receive the message (ID's match) and set or modify monitoring characteristics for the associated auxiliaries. If there are two intelligent I/O expanders 50 configured as auxiliaries, one expander would be AUX 1-4 and the other would be AUX 5-8.

Communication from the intelligent I/O expander 50 is generally indicated at 98. The intelligent I/O expander 50 monitors the auxiliaries through the configurable multi-device interface 54 based upon the monitoring characteristics. When changes are detected, or above a threshold, or below a threshold, the data is recorded in memory 52 of the intelligent I/O expander 50. The recorded data may be analog data, digital data, or both analog and digital data. The intelligent I/O expander may formulate a message and send the I/O expander ID and message to the messaging interface 53. The vehicular telemetry hardware system 30 receives the message (ID's match) over the messaging interface 53 and logs the data contained in the message into memory 35. Data from auxiliaries may be logged as analog, digital, or both analog and digital values. The vehicular telemetry hardware system 30 may also communicate the data to a remote site (server 19).

Figure 12:
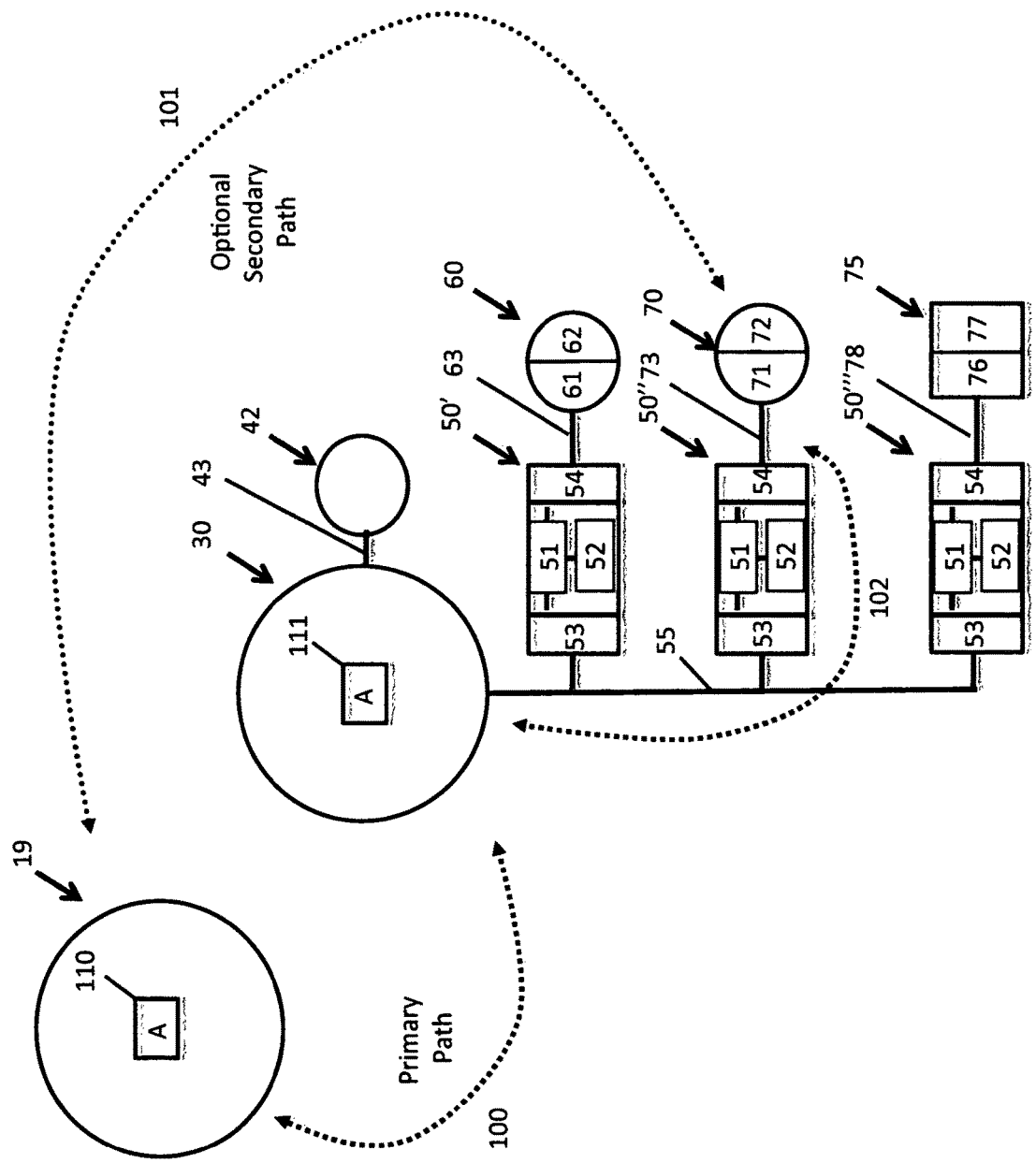
FIG. 12 is a diagrammatic view of message communication over a communications network between a server, vehicular telemetry hardware system, and an intelligent I/O expander configured as a serial port type, passive expander mode with a vehicular telemetry hardware system active serial control mode.

Operation of the overall system will be explained with an example as illustrated in FIG. 12 where there are three intelligent I/O expanders connected to the private bus 55 and the vehicular telemetry hardware system 30. The intelligent I/O expanders include a Garmin device 60, (Garmin interface 61 and type of device 62) an Iridium device 70, (Iridium interface 71 and type of device 72), and additional vehicle sensors 75 as AUX 1-4 (77) and AUX interface 76. In addition, there is a Geotab intelligent configuring cable 73 between the multi-device interface 54 (50') and Garmin interface 61 cable 63, a Geotab intelligent configuring cable 73 between the multi-device interface 54 (50″) and Iridium interface 71, and a Geotab intelligent configuring cable 73 between multi-device interface 54 (50‴) and auxiliaries interface 76. The additional vehicle sensors in this example include drivers side door (open/close), passengers side door (open/close), and cargo door (open/close) (AUX 1, 2, and 3) (AUX 4 is not used).

Under normal operation, the vehicular telemetry hardware system 30 and DCE wireless telemetry communications microprocessor 32 communicate messages over the cellular network 17. This is referred to as the primary path 100.

If the message 111 originates with the vehicular telemetry hardware system 30, the message 111 would be sent over the cellular network 17, or primary path 100 and received by the server 19 as the message 110. If the message 110 originates with the server 19, the message 110 would be sent over the cellular network 19, or primary path 100 and received by the vehicular telemetry hardware system 30 as message 111.

If for some reason the cellular network 17 is unavailable, then the vehicular telemetry hardware system 30 and DTE telemetry microprocessor 31 may continue to communicate over the satellite network 13 (assuming and intelligent I/O expander 50 and Iridium like satellite communications device). This is referred to as a secondary path 101 and 102. In this case, an intelligent I/O expander 50″ is interfaced to the vehicular telemetry hardware system 30 and initialized and configured as a serial type in an passive expander mode and the vehicular telemetry hardware system 30 is initialized in an active control mode with the instructions and logic for control and operation of the serial device (Iridium device 70).

If the message 111 originates with the vehicular telemetry hardware system 30, the message 111 would be sent over the private bus 55 to an intelligent I/O expander 50″ with the Iridium device 70. The message would be converted or reformatted by the intelligent I/O expander 50 and sent to the Iridium device 70 over the multi-device bus 56 and cable 73. The Iridium device 70 would then provide satellite communications 12 and the server 19 would receive the message as 110.

Additionally, a message 110 could be sent by the server 19 and received by the Iridium device 70 and provided to the intelligent I/O expander 50″ through the multi-device bus 56 and cable 73. The intelligent I/O expander 50″ would send a converted or reformatted message to the vehicular telemetry hardware system 30 over the private bus 55 and the message would be received as 111.

Figure 13:
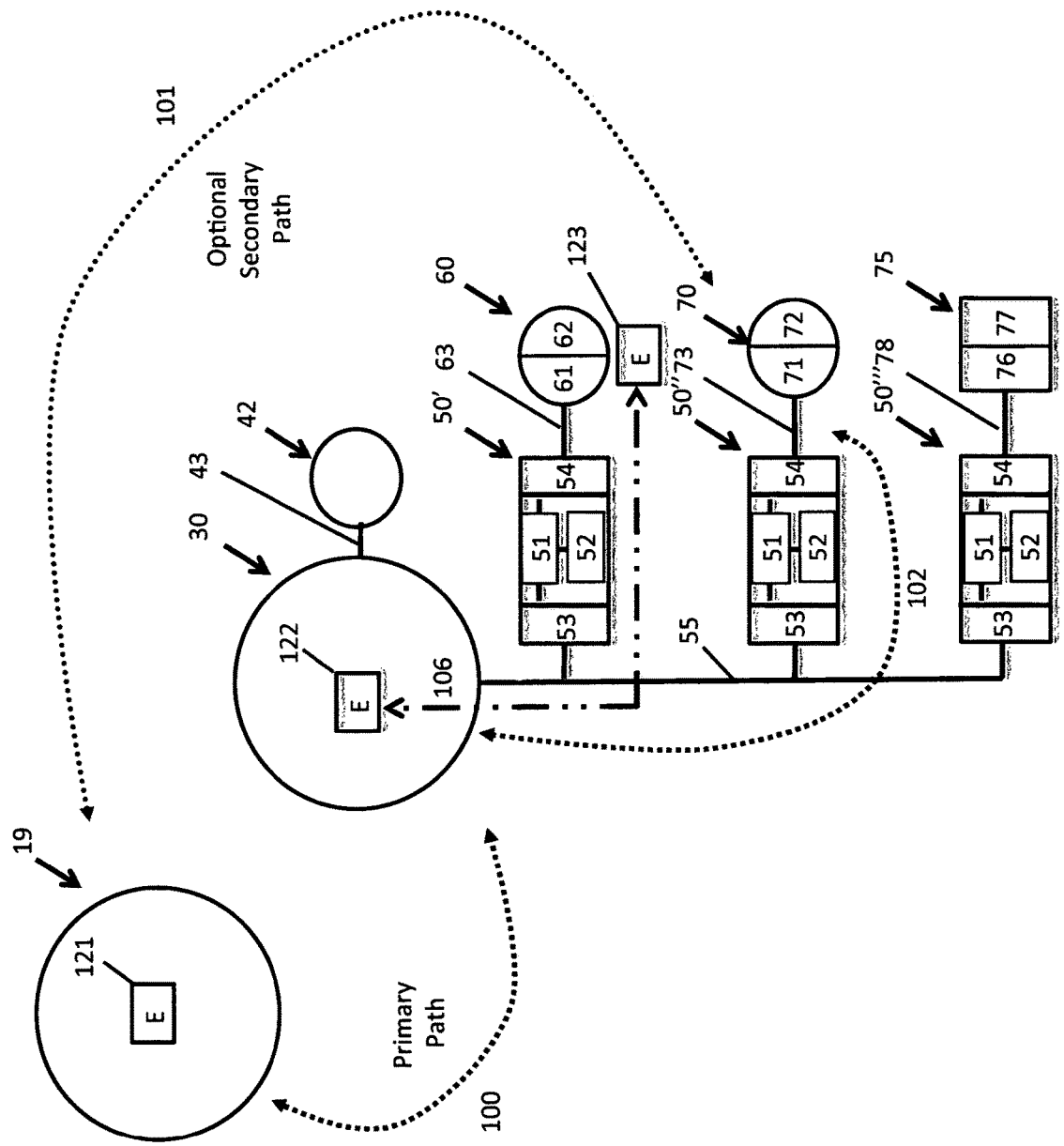
FIG. 13 is a diagrammatic view of message communication over a communications network between a server, vehicular telemetry hardware system and an intelligent I/O expander configured as a serial type, passive expander mode with a vehicular telemetry hardware system passive serial control mode.

Referring now to FIG. 13, a further example of an embodiment of the invention is described. In this example, an intelligent I/O expander 50′ is initialized and configured as a serial type in a passive expander mode and the vehicular telemetry hardware system 30 is configured in a passive control mode and may convert or reformat the message between the server 19 and the intelligent I/O expander 50′.

Starting with a message 121 in the server 19 to be sent to a Garmin device 60. The message 121 may be provided to the vehicular telemetry hardware system 30 by way of either the primary path 100 or the secondary path 101,102 as previously described. The vehicular telemetry hardware system 30 receives the message as 122 and converts or reformats the message for sending the message over the private bus 55 to the intelligent I/O expander 50′ identified with the Garmin device 60. The intelligent I/O expander 50 receives the message over the private interface 53 (50′) and converts or reformats the message by the microprocessor 51 and memory 52. The message is then sent over the multi-device interface 54 (50′), Geotab intelligent configuring cable 56 to the Garmin interface 61 where the Garmin device receives the message at 123.

Additionally, a message 123 could be provided to the server 19. The message 123 is provided by the Garmin device 60 to the Garmin interface 61, the Geotab intelligent configuring cable 56, and received by the intelligent I/O expander 50 through the multi-device interface 54 (50′). The intelligent I/O expander 50′ converts or reformats the message and provides the message to the private interface 53 (50′) and the private bus 55 to the vehicular telemetry hardware system 30. The vehicular telemetry hardware system 30 converts or reformats the message 122 and provides the message to the server 19 as 121 by way of the primary path 100 or the secondary path 101, 102.

Figure 14:
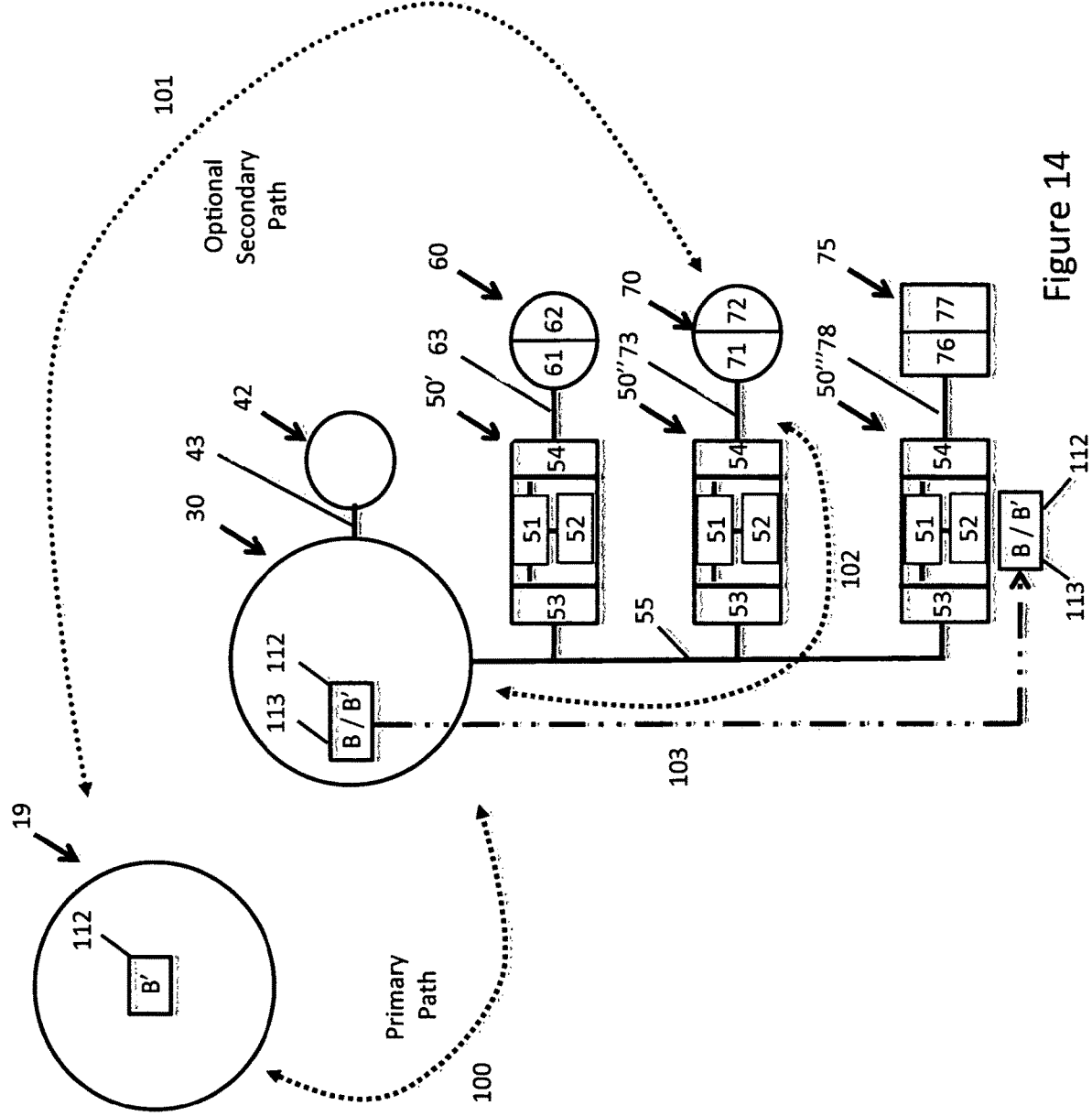
FIG. 14 is a diagrammatic view of message communication over a communications network between a server, vehicular telemetry hardware system, and an intelligent I/O expander configured as an auxiliaries type, active expander mode, and receiving monitoring characteristics.

Referring now to FIG. 14, a further example of an embodiment of the invention is described. In this example, an intelligent I/O expander 50‴ is initialized and configured as an auxiliaries type in an active expander mode and interfaced by the Geotab™ intelligent configuring cable 78 to the auxiliaries.

In a first embodiment of the invention, the vehicular telemetry hardware system 30 may have the monitoring characteristics for the intelligent I/O expander 50‴ as a message 113. The message 113 is provided by the vehicular telemetry hardware system 30 over the private bus 55 to the private interface 53 of the intelligent I/O expander 50‴ as 113. The microprocessor 51 and memory 52 of the intelligent I/O expander 50‴ establish monitoring of the auxiliaries based upon the monitoring characteristics in the message 113.

Additionally, the server 19 may provide the monitoring characteristics. A message 112 is provided to the vehicular telemetry hardware system 30 by way of the primary path 100 or the secondary path 101, 102. The vehicular telemetry hardware system 30 will convert or reformat the message 112 and provide the message to the intelligent I/O expander 50‴ over the private bus 55 and private interface 53 of the expander 50‴. The microprocessor 51 and memory 52 of the intelligent I/O expander 50‴ establish monitoring of the auxiliaries based upon the monitoring characteristics in the message 112.

Figure 15:
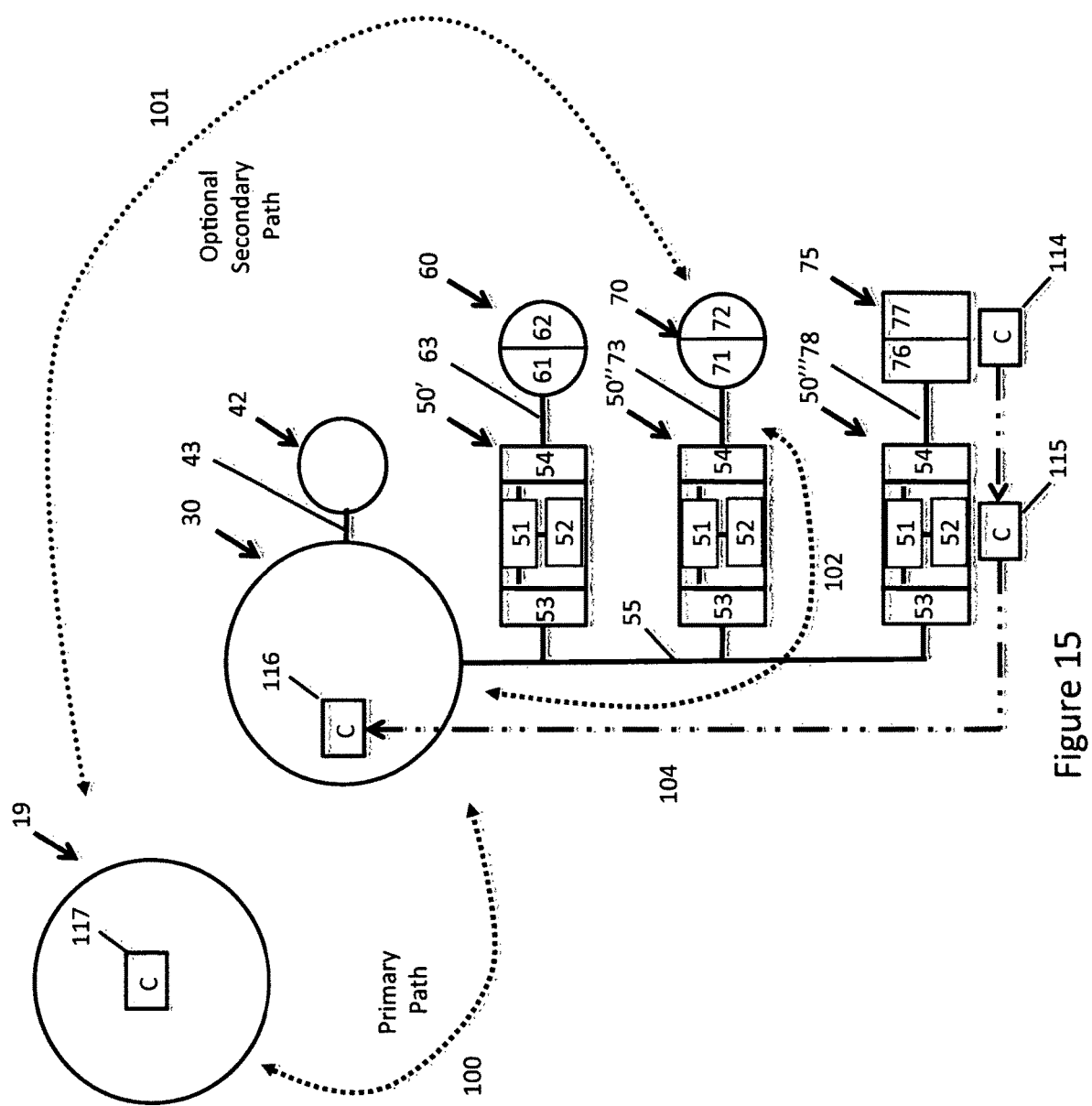
FIG. 15 is a diagrammatic view of message communication over a communications network between a server, vehicular telemetry hardware system, and an intelligent I/O expander configured as an auxiliaries type, active expander mode, sensing auxiliaries data.

Referring now to FIG. 15, a further example of an embodiment of the invention is described. In this example, an intelligent I/O expander 50‴ is initialized and configured as an auxiliaries type in the active mode and interface by the Geotab intelligent configuring cable 78 to the auxiliaries. Furthermore, the intelligent I/O expander 50‴ has received the monitoring characteristics and is monitoring the auxiliaries.

Upon detecting a change or a threshold event, data 114 is captured by the intelligent I/O expander 50‴ through the cable 78 and multi-device interface 54. The microprocessor 51 and memory 52 of the intelligent I/O expander 50‴ create a message 115 containing the data 114. The message 115 is provided to the vehicular telemetry hardware system 30 by way of the private interface 53 of the intelligent I/O expander 50‴ and the private bus 55.

The vehicular telemetry hardware system 30 converts or reformats the message 116 and logs the data. The vehicular telemetry hardware system 30 may further provide the data in a message to the server 19 by way of the primary path 100 or the secondary path 101, 102. Application software on the server 19 receives the message and associated data 114 for further analysis. The application software has an associated log to understand what types of auxiliaries are associated with AUX 1-4 as well as AUX 5-8. For example, AUX 1 is door (open/close), AUX 2 is passengers side door (open/close), and AUX 3 is cargo door (Open/close).

Figure 16:
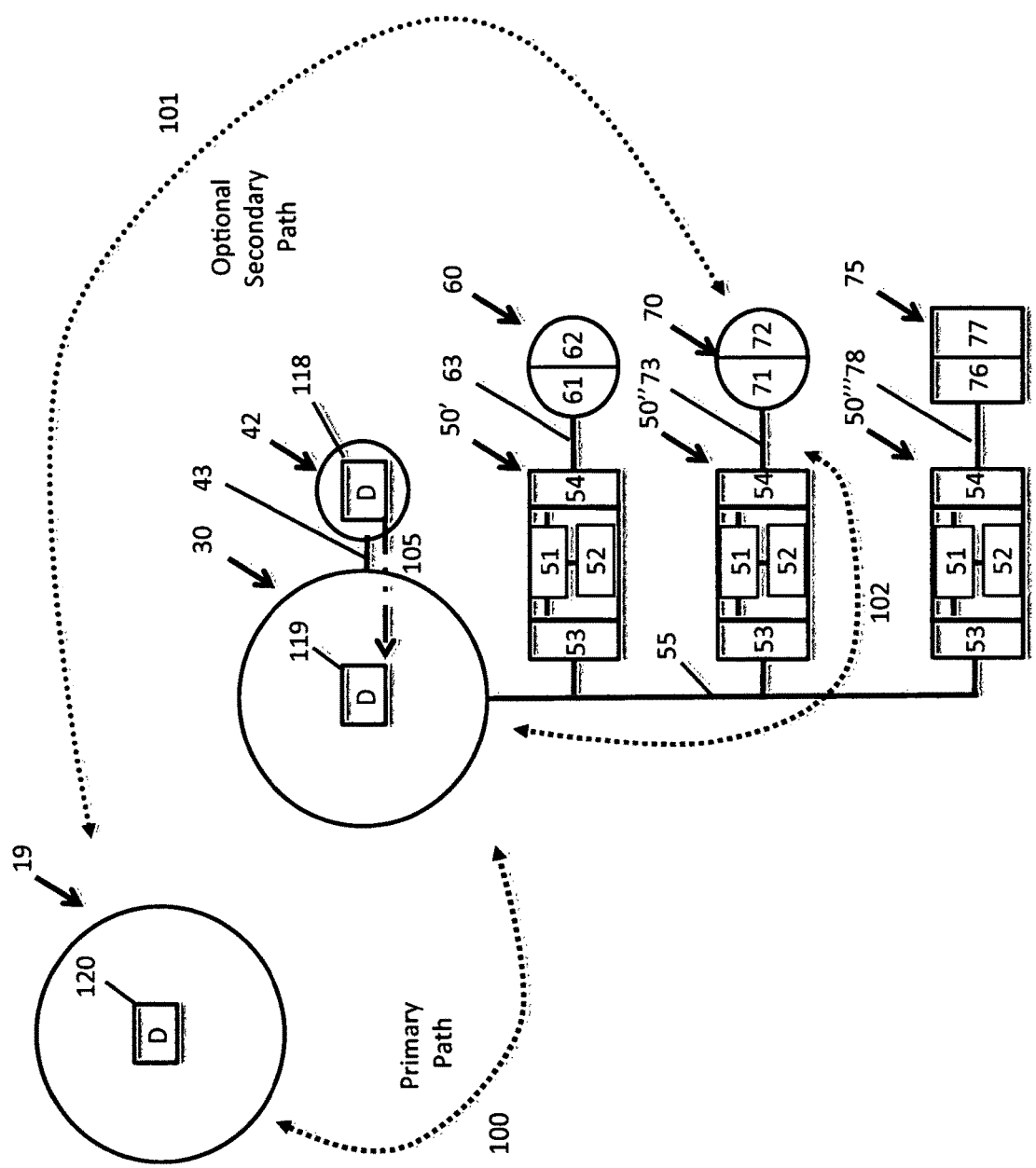
FIG. 16 is a diagrammatic view of message communication over a communications network between a server, vehicular telemetry hardware system, resident vehicular portion with vehicle data and information, and an intelligent I/O expander with satellite communications capability.

A final example is described with reference to FIG. 16. The vehicular telemetry hardware system 30 is monitoring the resident vehicular portion 42 over the vehicle connection 43. Data 118 may be logged by the vehicular telemetry hardware system 30. The vehicular telemetry hardware system 30 may provide the data 118 as a message 119 to the server 19 as message 120. The message 119 may be provided to the server by way of the primary path 100 or the secondary path 101, 102 (if an intelligent I/O expander with an Iridium like satellite communications device is present). The vehicular telemetry hardware system 30 may provide the data immediately to the server 19 by way of the Iridium device upon detecting a significant event such as an accident.

Embodiments of the present invention provide one or more technical effects. Intelligent expansion of a vehicular telemetry hardware system. Protocol conversion, converting or reformatting of messages between a private bus and a multi-device bus. Configurable intelligent I/O expanders 50 as either a serial type or an auxiliaries type. Intelligent I/O expanders configurable to either a passive expander mode or an active expander mode. A vehicular telemetry hardware system configurable in part for an active control mode or a passive control mode. Logical recognition of auxiliary conductors as either AUX 1-4 or AUX 5-8. Monitoring and data logging of auxiliaries. Parallel processing of auxiliaries connected to an intelligent I/O expander reducing the workload of the vehicular telemetry hardware system microprocessor. Monitoring and data logging of Bluetooth beacon unique identifiers and associated beacon data such as beacon accelerometer data, beacon temperature data, beacon luminance or light data, beacon pressure data, beacon battery level or beacon user defined sensor data. Communication of the Bluetooth beacon unique identifiers and associated data to a server and the MyGeotab software application for further processing and analysis. Further processing to indicate for each object associated with each unique identifier a harsh or out of limit acceleration, temperature, light and/or pressure leading to damage conditions, hazardous conditions or missing object conditions. Distributed control logic and machine instructions between a server, a vehicular telemetry hardware system, and intelligent I/O expander.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

What is claimed is:

1. A telemetry wireless beacon apparatus comprising:
   a wireless beacon communication device,
   a vehicle device, and
   a relative position discriminator,
   said wireless beacon communication device for communicating with at least one beacon device,
   said vehicle device further comprising a processor, firmware, communications processor, telematic sensors and at least one interface to communicate with a vehicle network communications bus and to communicate with said wireless beacon communication device,
   said relative position discriminator configured to identify each of one or more of said at least one beacon device as a vehicle-associated beacon device for communication with said wireless beacon communication device in response to detecting each such beacon device, of the one or more of the at least one beacon device, within at least one threshold of at least one virtual boundary for a vehicle at both a first location of the vehicle and a second location of the vehicle, said at least one virtual boundary being location-based and/or motion-based and being associated with and moveable with the vehicle,
   wherein said processor and firmware capable to monitor and receive data in real time from said at least one interface, said telematics sensors, said wireless beacon communication device, and said vehicle associated beacon device thereby capable to log said data for subsequent communication to a remote device.

2. A telemetry wireless beacon apparatus as in claim 1 wherein said telematics sensors include at least one of an accelerometer device or GPS device.

3. A telemetry wireless beacon apparatus as in claim 1 wherein said wireless beacon communication device is a Bluetooth wireless beacon communication device capable of communicating with a beacon device.

4. A telemetry wireless beacon apparatus as in claim 1 further comprising an I/O expander.

5. A telemetry wireless beacon apparatus as in claim 1 wherein said wireless beacon communication device is integral with said vehicle device.

6. A telemetry wireless beacon apparatus as in claim 4 wherein said wireless beacon communication device is integral with said I/O expander.

7. A telemetry wireless beacon apparatus as in claim 4 wherein said wireless beacon communication device is a device connectable to said I/O expander.

8. A telemetry wireless beacon apparatus as in claim 1 further comprising said at least one beacon device associated with at least one object.

9. A telemetry wireless beacon apparatus as in claim 8 wherein said at least one object is selected from the group of package, equipment, vehicle or people.

10. A telemetry wireless beacon apparatus as in claim 8 wherein said at least one beacon device further comprises a beacon processor, beacon firmware, beacon radio module and at least one of a beacon accelerometer and beacon sensors.

11. A telemetry wireless beacon apparatus as in claim 10 wherein said beacon sensors are selected from the group of a temperature sensor, an illumination sensor, a pressure sensor, a battery sensor or a user defined sensor.

12. A telemetry wireless beacon apparatus as in claim 10 wherein said data is selected from the group of a beacon unique identifier data, beacon temperature data, beacon light data, beacon pressure data, bacon battery data or user defined data.

13. A telemetry wireless beacon apparatus as in claim 1 wherein said data is selected from the group of GPS data, engine data, vehicle data, speed data, position data, direction data or vehicle acceleration data.

14. A telemetry wireless beacon apparatus as in claim 13 wherein said data is further selected from the group of beacon unique identifier data, beacon temperature data, beacon light data, beacon pressure data, beacon acceleration data, beacon battery data or beacon user defined data.

15. A telemetry wireless beacon apparatus as in claim 1 wherein said data is selected from the group of beacon unique identifier data, beacon temperature data, beacon light data, beacon pressure data, beacon acceleration data, beacon battery data or beacon user defined data.

16. A telemetry wireless beacon data monitoring and logging method comprising:
monitoring and receiving data from at least one of an interface to vehicle engine data or telematics sensors,
identifying each beacon device of one or more beacon devices as a vehicle-associated beacon device for communication of vehicle-associated beacon data, wherein identifying each beacon device of the one or more beacon devices as said vehicle-associated beacon device comprises discriminating, at both a first location of a vehicle and a second location of the vehicle, a relative position of the beacon device with respect to at least one threshold of at least one virtual boundary for the vehicle, said at least one virtual boundary being location-based and/or motion-based and said at least one virtual boundary being associated with and moveable with the vehicle,
receiving said vehicle-associated beacon data provided by a wireless beacon communication device, and logging said data and said vehicle-associated beacon data as telemetry data for subsequent communication to a remote device.

17. A telemetry wireless beacon data monitoring and logging method as in claim 16 wherein said telematics sensors includes an accelerometer and said data includes accelerometer data.

18. A telemetry wireless beacon data monitoring and logging method as in claim 16 wherein said telematics sensors includes a GPS device and said data includes location data.

19. A telemetry wireless beacon data monitoring and logging method as in claim 16 wherein said data includes engine data and vehicle speed data.

20. A telemetry wireless beacon data monitoring and logging method as in claim 16 wherein said receiving said vehicle-associated beacon data provided by a wireless beacon communication device includes beacon data from a beacon device.

21. A telemetry wireless beacon data monitoring and logging method as in claim 20 wherein said beacon data includes unique identifier data for each beacon device.

22. A telemetry wireless beacon data monitoring and logging method as in claim 21 wherein said beacon data further includes data selected from the group of beacon temperature data, beacon light data, beacon pressure data, beacon acceleration data, beacon battery data or beacon user defined data.

23. A telemetry wireless beacon data monitoring and logging method as in claim 16 wherein said receiving said vehicle-associated beacon data provided by a wireless beacon communication device is received directly by a telemetry wireless beacon apparatus.

24. A telemetry wireless beacon data monitoring and logging method as in claim 16 wherein said receiving said vehicle-associated beacon data provided by a wireless beacon communication device is received indirectly through an I/O expander.

25. A telemetry wireless beacon system comprising:
a wireless beacon communication device,
at least one beacon device,
at least one remote device,
at least one vehicle device, and
a relative position discriminator,
said at least one vehicle device further comprising a processor, firmware, communications processor, telematics sensors and at least one interface to communicate with a vehicle network communications bus and to communicate with said wireless beacon communication device,
said at least one beacon device capable to communicate beacon data with said wireless beacon communication device,
said at least one vehicle device capable to communicate with said at least one remote device,
said relative position discriminator configured to identify each of one or more of said at least one beacon device as a vehicle-associated beacon device for communication with said wireless beacon communication device in response to detecting each such beacon device, of the one or more of the at least one beacon device, within at least one threshold of at least one virtual boundary for a vehicle at both a first location of the vehicle and a second location of the vehicle, said at least one virtual boundary being location-based and/or motion-based and being associated with and moveable with the vehicle,
wherein said processor and firmware capable to monitor and receive data from said at least one interface, said telematics sensors, said wireless beacon communication device, and said vehicle-associated beacon device thereby capable to log said data for subsequent communication to said at least one remote device.

26. A telemetry wireless beacon system as in claim 25 wherein said telematics sensors include at least one of an accelerometer or GPS device.

27. A telemetry wireless beacon system as in claim 25 wherein said wireless beacon communication device is Bluetooth wireless beacon communication device.

28. A telemetry wireless beacon system as in claim 25 further comprising an I/O expander.

29. A telemetry wireless beacon system as in claim 25 wherein said wireless beacon communication device is integral with said at least one vehicle device.

30. A telemetry wireless beacon system as in claim 28 wherein said wireless beacon communication device is integral with said I/O expander.

31. A telemetry wireless beacon system as in claim 28 wherein said wireless beacon communication device is a device connectable to said I/O expander.

32. A telemetry wireless beacon system as in claim 25 wherein said at least one beacon device is associated with at least one object.

33. A telemetry wireless beacon system as in claim 32 wherein said at least one object is selected from the group of package, equipment, vehicle or people.

34. A telemetry wireless beacon system as in claim 25 wherein said data is selected from the group of GPS data, engine data, vehicle data, vehicle speed data, position data, direction data or vehicle acceleration data.

35. A telemetry wireless beacon system as in claim 34 where said data is further selected from the group of beacon unique identifier data, beacon temperature data, beacon light data, beacon pressure data, beacon acceleration data, beacon battery data or beacon user defined data.

36. A telemetry wireless beacon system as in claim 25 wherein said at least one beacon device further comprises a beacon processor, beacon firmware, beacon radio module and at least one of a beacon accelerometer or beacon sensors.

37. A telemetry wireless beacon system as in claim 36 wherein said beacon sensors are selected from the group of a temperature sensor, an illumination sensor, a pressure sensor, an acceleration sensor, a battery sensor or a user defined sensor.

38. A telemetry wireless beacon system as in claim 37 wherein said data is selected from the group of a beacon unique identifier data, beacon temperature data, beacon light data, beacon pressure data, beacon acceleration data, beacon battery data or beacon user defined data.

* * * * *